United States Patent
Liu et al.

(10) Patent No.: US 12,314,265 B1
(45) Date of Patent: May 27, 2025

(54) METHOD AND SYSTEM FOR CONTENT-BASED INDEXING OF DATA STREAMS IN STREAMING STORAGE SYSTEMS

(71) Applicant: Dell Products L.P., Round Rock, TX (US)

(72) Inventors: Yi Liu, Shanghai (CN); Raúl Gracia-Tinedo, Barcelona (ES); Flavio Paiva Junqueira, Barcelona (ES); Thomas Kaitchuck, Portland, OR (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/419,820

(22) Filed: Jan. 23, 2024

(51) Int. Cl.
*G06F 16/2455* (2019.01)
*G06F 9/54* (2006.01)
*G06F 16/22* (2019.01)
*G06F 16/248* (2019.01)

(52) U.S. Cl.
CPC ........ *G06F 16/24568* (2019.01); *G06F 9/547* (2013.01); *G06F 16/22* (2019.01); *G06F 16/248* (2019.01)

(58) Field of Classification Search
CPC .. G06F 16/24568; G06F 16/22; G06F 16/248; G06F 9/547
See application file for complete search history.

(56) References Cited

U.S. PATENT DOCUMENTS

| | | | | |
|---|---|---|---|---|
| 10,909,131 | B1* | 2/2021 | Graham | G06F 16/901 |
| 10,929,404 | B2* | 2/2021 | Lei | G06F 16/27 |
| 10,931,504 | B2* | 2/2021 | Massaguer | G06F 16/24568 |
| 11,074,264 | B2* | 7/2021 | Poppe | G06F 16/24553 |
| 2020/0364279 | A1* | 11/2020 | Pal | G06F 16/24568 |
| 2020/0401621 | A1* | 12/2020 | Bender | G06F 16/735 |
| 2023/0107652 | A1* | 4/2023 | Veselova | G06F 16/24552 |

OTHER PUBLICATIONS

Pavani Baddepudi, "Open Distro for Elasticsearch 1.4.0 with K-nearest neighbor (k-NN) search support is now available", OpenSearch, <https://opensearch.org/blog/Open-Distro-forElasticsearch-1.4.0-with-K-nearest-neighbor-(k-NN)-search-support-isnow-available/> dated on Feb. 11, 2020. Retrieved on Apr. 22, 2024.

(Continued)

*Primary Examiner* — Huawen A Peng
(74) *Attorney, Agent, or Firm* — Chamberlain, Hrdlicka, White, Williams & Aughtry; Aly Z. Dossa

(57) ABSTRACT

A method for managing a data stream (DS) includes: receiving a first request from an administrator; obtaining the DS from a streaming storage system (SSS); performing a first analysis of the DS to extract relevant data; making a first determination that the relevant data is worth indexing; generating a set of indexes corresponding at least a portion of the DS; receiving a query about a data item in the DS from a user; sending a second request to a database engine comprising the query; performing a second analysis of the query; making a second determination that a re-indexing of the portion of the DS is not required; identifying an index from the set of indexes that is associated with the query; sending position information of the data item to an API service; retrieving the data item from the SSS; and initiating displaying of the data item to the user.

20 Claims, 7 Drawing Sheets

(56) References Cited

OTHER PUBLICATIONS

Satish Duggana et al., "KIP-405: Kafka Tiered Storage", Apache Kafka—Apache Software Foundation, <https://cwiki.apache.org/confluence/display/KAFKA/KIP-405%3A+Kafka+Tiered+Storage#KIP405:KafkaTieredStorage-Kafkaasalong-termstoragese%E2%80%A6> dated Sep. 17, 2023. Retrieved on Apr. 22, 2024.
"The practice of HLS live streaming protocol at Station B", Bilibili, <https://www.bilibili.com/read/cv18179472/> dated Aug. 18, 2022. Retrieved on Apr. 22, 2024.

* cited by examiner

| TIME | STREAM POSITION | CAR PLATE | CAR COLOR |
|---|---|---|---|
| time 0 | S0:100 | ABC-123 | RED |
| time 1 | S0:200 | BBB-456 | GREEN |
| time 2 | S0:300 | KKK-123 | BLUE |

*Expected queries from a user:*

(i) What is the average number of cars per hour?
(ii) Was car with plate "BBB-456" recorded yesterday?
(iii) How many red cars were recorded last year?

FIG. 2.1

*Document-based indexing*

```
{
  car plate: ABC-123,
  car color: RED,
  stream position: {S0:100},
  car brand: BGBG,
  car model: 15R
}
```

*Expected queries from a user:*

(i) What is the color of the car with the plate number "ABC-123"?
(ii) Is car with the plate number "ABC-123" a "BGBG 15R"?

FIG. 2.2

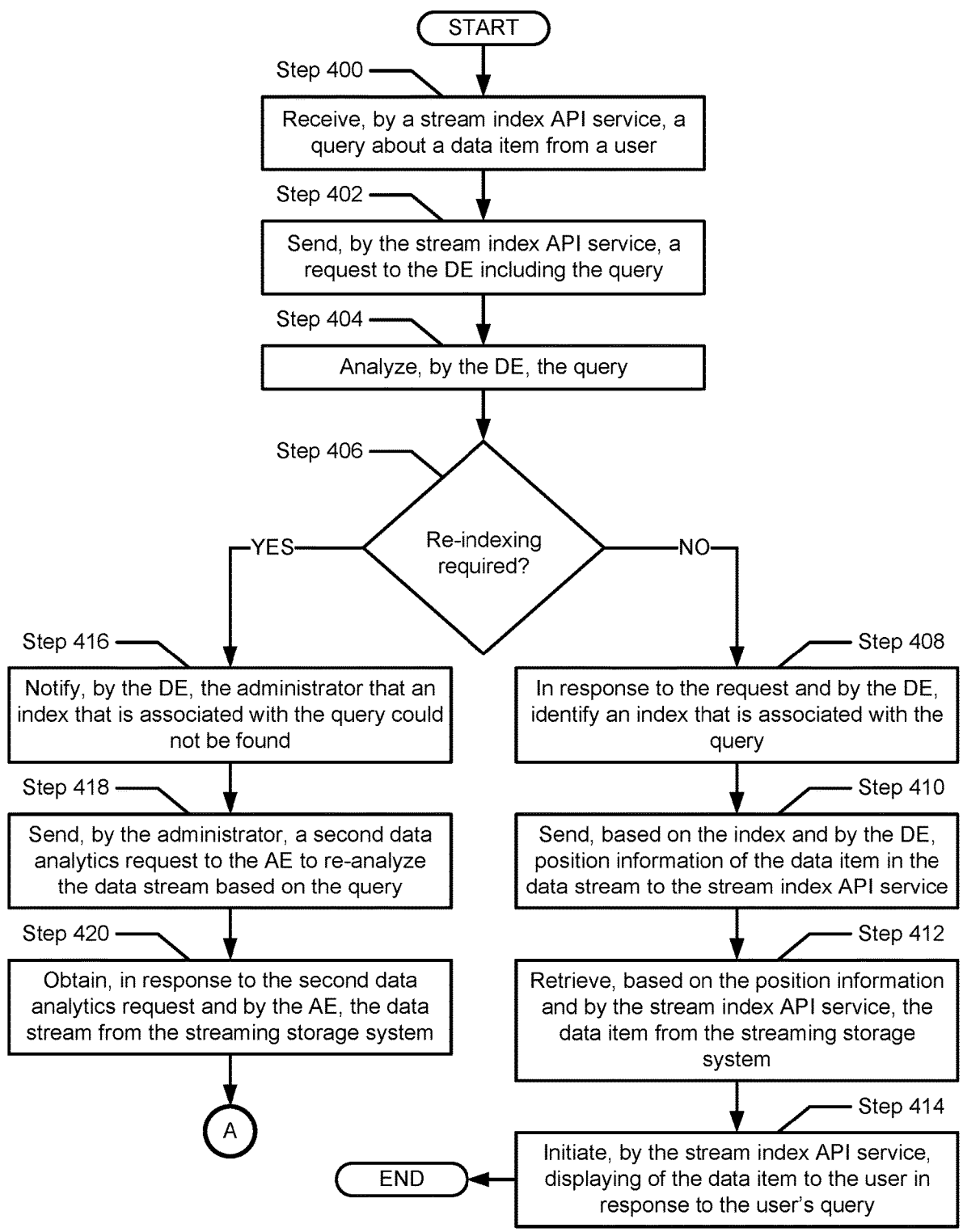
FIG. 4.1

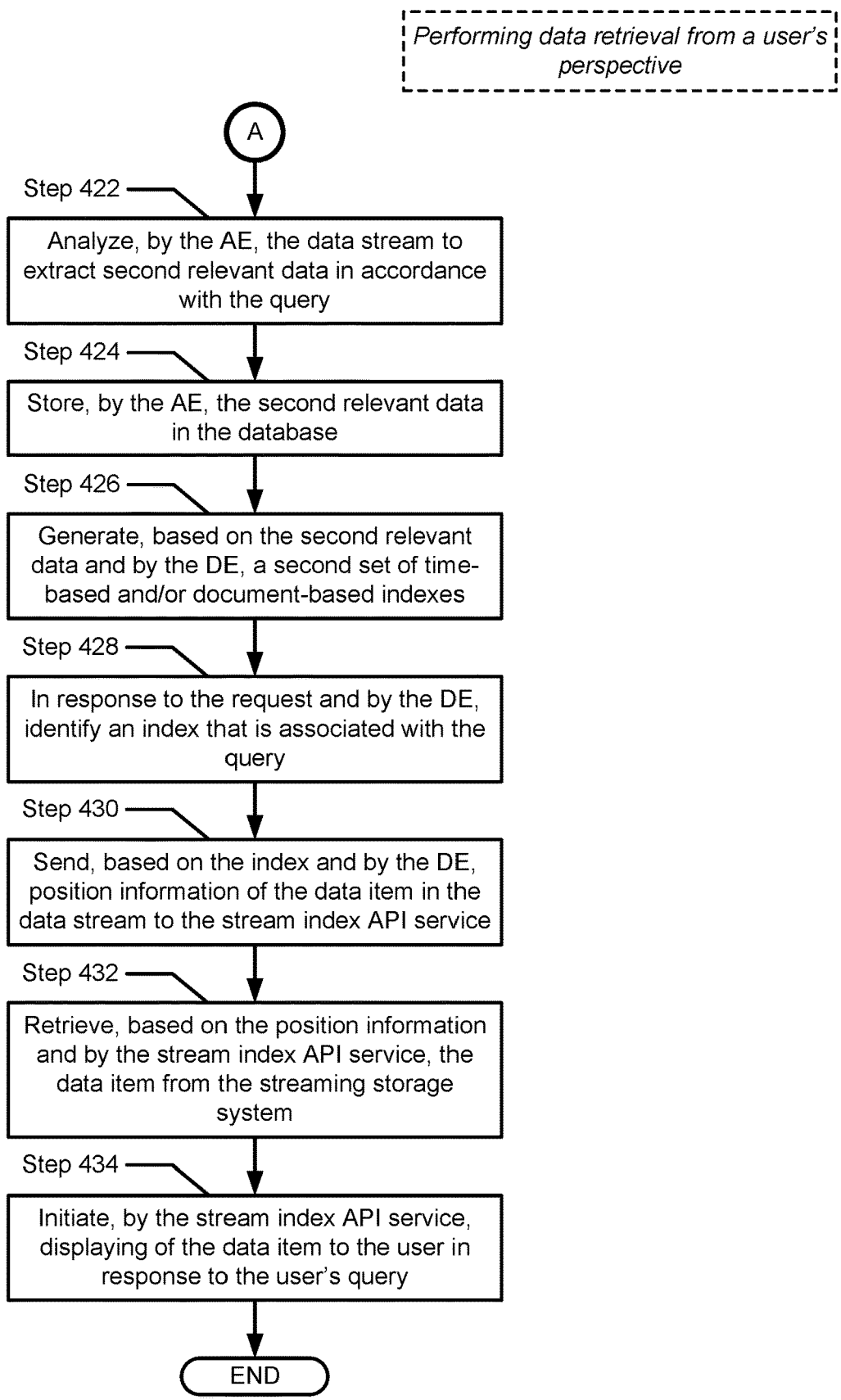
FIG. 4.2

METHOD AND SYSTEM FOR CONTENT-BASED INDEXING OF DATA STREAMS IN STREAMING STORAGE SYSTEMS

BACKGROUND

Streaming applications are applications that deal with a large amount of data arriving continuously. In processing streaming application data, the data can arrive late, arrive out of order, and the processing can undergo failure conditions. It may be appreciated that tools designed for previous generations of big data applications may not be ideally suited to process and store streaming application data.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.2 shows a diagram of a streaming storage system in accordance with one or more embodiments of the invention.

FIG. 2.2 shows an example document-based indexing in accordance with one or more embodiments of the invention.

FIGS. 4.1 and 4.2 show a method for performing data retrieval from a user's perspective in accordance with one or more embodiments of the invention.

DETAILED DESCRIPTION

Figure 1:
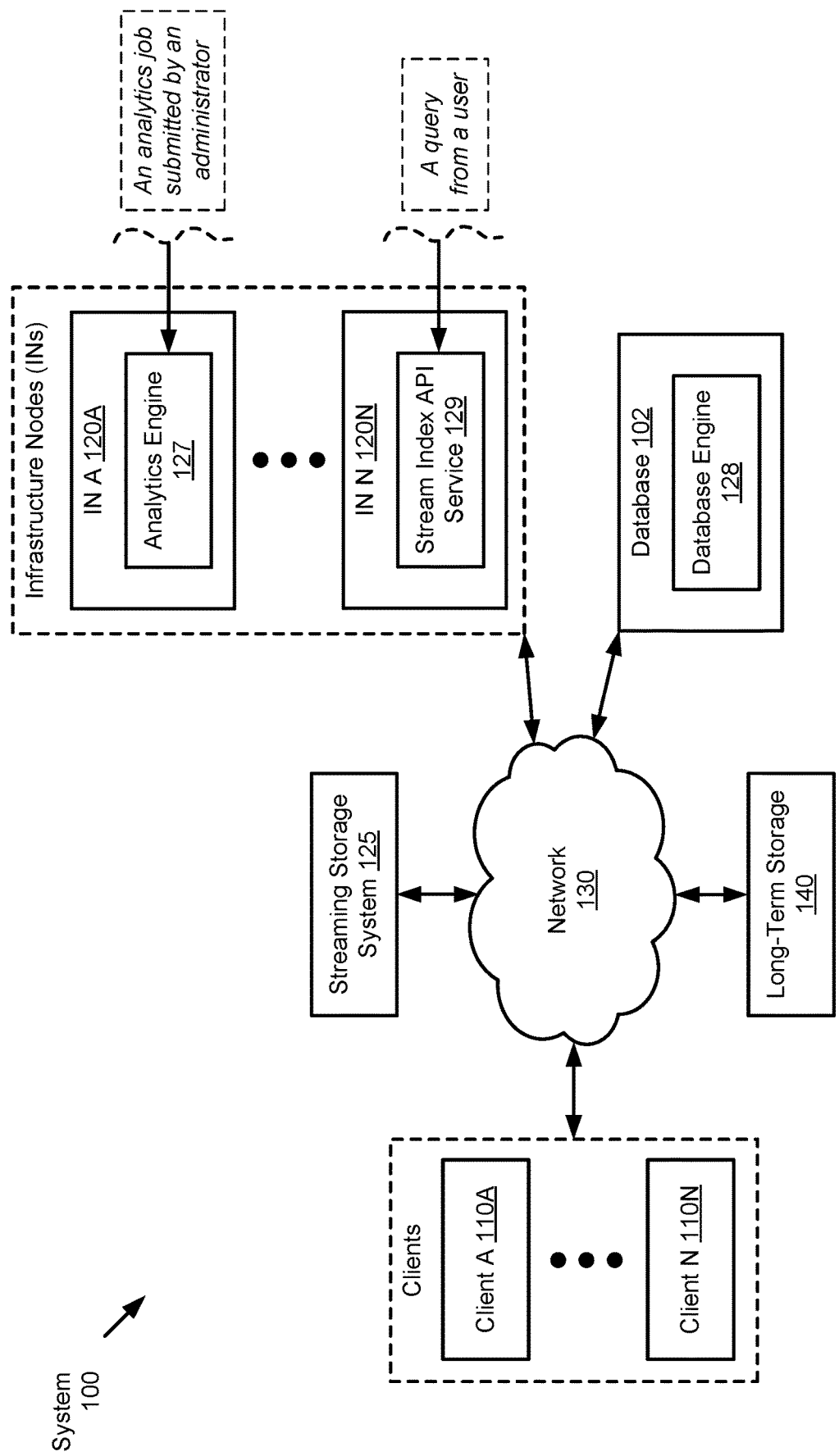
FIG. 1.1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, streaming data applications process data from data sources (e.g., social media networks, online retailer applications, streaming services, financial data applications, Internet of Things (IoT) devices, etc.) that may independently generate data/events at different times. Streaming data applications typically utilize storage systems (e.g., streaming storage systems such as Pravega, an open-source streaming storage engine, Apache Kafka, Apache Pulsar, etc.) because data representing events in a system may be received and stored independent of reading or processing of the data, and further may be written by different writers of the system at different writing rates, as well as read by different readers at different reading rates.

In most cases, a streaming storage system is an ideal substrate to store and/or process events/data generated by data sources, such as video frames from cameras. A streaming storage system normally provides semantics and guarantees to manage continuous events generated by the data sources with respect to durability, consistency, and/or scalability. In certain cases, a streaming storage system may enable/offer storage tiering, in which "tail" streaming data is persisted in a replicated log while historical streaming data is tiered to scale-out storage. This becomes relevant when a streaming storage system needs to store a large amount of data (e.g., historical videos from surveillance cameras) for long-term purposes.

On the other hand, while streaming storage systems are useful for writing and/or reading data sequentially, these systems do not offer means for searching and retrieving data within a data stream. To do so, streaming storage systems may need to be augmented with search (or indexing) engines/modules/systems, such as ksqlDB or ElasticSearch. These indexing engines mostly focus on individual words, phrases, and/or sentences; allowing users to perform detailed data search and/or retrieval at a later point-in-time. For example, such indexing engines may build an index (e.g., a data structure) over an entire data stream that allows users and/or administrators (e.g., researches, developers, etc.) to efficiently search for specific items within the data stream.

However, while conventional streaming storage systems may operate in conjunction with one or more indexing engines for indexing textual data (e.g., words, phrases, sentences, etc.), a combination of these conventional systems lacks the capability of indexing video data. In most cases, video data has different/specific needs (e.g., in terms of indexing) compared to textual data (e.g., video data cannot be directly indexed by conventional indexing engines) and, because of that, indexing video data has received less attention. For example, video data (involving moving images and/or audio) requires a more complex indexing process, which typically includes extracting one or more features from video frames, audio segments, and/or metadata. For this purpose, methods like video summarization, object recognition, and/or speech-to-text conversion may be employed to make video content searchable.

As yet another example, the granularity of indexing video data may vary, from indexing entire video to individual frames, scenes, objects, and/or spoken words. As indicated, a key difference indexing video data compared to indexing textual data is related to completeness. Said another way, while all the content of textual data (or a textual data stream) is typically indexed, video data (or a video data stream) may include a fraction of data that does not need to be indexed (e.g., video frames that include empty streets with car license plate numbers). As yet another example, video stream data may need to be processed by different types of "inference" jobs/workloads during its lifetime (e.g., apart from car license plate numbers, a user may want to identify a number of pedestrians within a specific scene using the same video data stream at a later point-in-time).

Further, real-world video-based applications require database technology that is capable of storing video data streams (or video streams) and providing content-based video search and retrieval. However, conventional methods for managing (and analyzing) logs/metadata (including textual data) cannot be simply extended to provide the same functionality for video streams. For example, the common media application format (CMAF) was mostly used (i) as a format that is cross-compatible with the hypertext transfer protocol live streaming (HTTP HLS) and the dynamic adaptive streaming over HTTP (DASH), (ii) to reduce the complexity and redundancy of data streaming. In recent years, the "CMAF mp4" technique has become widely adopted by various streaming providers, in which, instead of storing video stream data to a database, this technique slices the stream data into small video segments and writes the segments directly into file systems.

In current streaming systems, such as Apache Kafka, tiered storage is not available in an open-source version, which means Apache Kafka still needs to use local disks for storage. Unlike Apache Kafka, Apache Pulsar has decoupled the serving layers from the storage layers, which allows offloading historical data to more cost-effective storage. However, when reprocessing the historical data, Apache Pulsar does not provide much benefit compared to reading data from a file, as a user may scan the whole Apache Pulsar "topic" (from head to tail) to reprocess the historical data.

For at least the reasons discussed above and without requiring resource (e.g., time, engineering, etc.) intensive efforts, a fundamentally different approach/framework is needed (e.g., a framework to index a video data stream (or any other type of data such as an audio data stream) stored in tiered streaming storage systems (e.g., Pravega)).

Embodiments of the invention relate to methods and systems for managing content-based indexing of data streams in streaming storage systems. As a result of the processes discussed below, one or more embodiments disclosed herein advantageously ensure that: (i) any type of data is considered for content-based indexing (e.g., a video data stream (which has different requirements, as discussed above), an audio data stream, a binary large object (BLOB), documents, logs, etc.); (ii) the framework stores large data objects while supporting data streaming scenarios (which is not possible today); (iii) a content-aware search in a video data stream is supported; (iv) the framework supports continuous storing and indexing of data streams; (v) the framework is enabled to store video stream metadata for content-aware data search (in a data stream) and retrieval of data (from the data stream); (vi) the framework considers an analytics processing job that identifies all the relevant features and/or objects from a video data stream (to allow for detailed data search and/or retrieval); (vii) based on (vi), a result of the analytics processing job is stored to a database (e.g., a temporal database, a document-based database, etc.) that serves/builds one or more indexes over an entire data stream (a) to optimize common types of queries executed by a user and (b) to allow the user to efficiently search for specified data items in the data stream for a better user/customer experience (which is not possible today); (viii) an analytics processing job is managed for achieving the maximum practical processing parallelism, without requiring resource-intensive efforts (e.g., for a better product management and development); (ix) the framework provides an application programming interface (API) service that abstracts users from accessing a corresponding index (stored in the database) and one or more features/contents of a data stream (to provide powerful data search (and/or retrieval) capabilities to the data stream); (x) the framework supports, at least, tiered streaming storage systems (as these systems can store vast amounts of historical data associated with video data streams that may require to be re-indexed over time); and/or (xi) users that want to perform real-time and/or batch processes across different nodes/computing devices are properly served.

The following describes various embodiments of the invention.

FIG. 1.1 shows a diagram of a system (100) in accordance with one or more embodiments of the invention. The system (100) includes any number of clients (e.g., Client A (110A), Client B (110B), etc.), a streaming storage system (125), a network (130), a long-term storage (140), any number of infrastructure nodes (INs) (e.g., IN A (120A), IN B (120B), etc.), and a database (102). The system (100) may facilitate, at least, the management of "stream" data from any number of sources (e.g., 110A, 110B, etc.). The system (100) may include additional, fewer, and/or different components without departing from the scope of the invention. Each component may be operably/operatively connected to any of the other components via any combination of wired and/or wireless connections. Each component illustrated in FIG. 1.1 is discussed below.

In one or more embodiments, the clients (e.g., 110A, 110B, etc.), the streaming storage system (125), the network (130), the long-term storage (140), the INs (e.g., 120A, 120B, etc.), and the database (102) may be (or may include) physical hardware or logical devices, as discussed below. While FIG. 1.1 shows a specific configuration of the system (100), other configurations may be used without departing from the scope of the invention. For example, although the clients (e.g., 110A, 110B, etc.) and the INs (e.g., 120A, 120B, etc.) are shown to be operatively connected through a communication network (e.g., 130), the clients (e.g., 110A, 110B, etc.) and the INs (e.g., 120A, 120B, etc.) may be directly connected (e.g., without an intervening communication network).

Further, the functioning of the clients (e.g., 110A, 110B, etc.) and the INs (e.g., 120A, 120B, etc.) is not dependent upon the functioning and/or existence of the other components (e.g., devices) in the system (100). Rather, the clients and the INs may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data) (including multiple events, each of which is associated with a routing key) that are continuously produced by streaming data sources (e.g., writers, clients, etc.), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing streaming application data (e.g., video stream data) in a tiered streaming storage system) and may deliver at least computing power (e.g., real-time network monitoring, server virtualization, etc.), storage capacity (e.g., data backup), and data protection (e.g., software-defined data protection, disaster recovery, etc.) as a service to users of clients (e.g., 110A, 110B, etc.). For example, the system may be configured to organize unbounded, continuously generated data into a stream (described below in reference to FIG. 1.2) that may be auto-scaled based on individual segment loading. The system (100) may also represent a comprehensive middleware layer executing on computing devices (e.g., 500, FIG. 5) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110B, etc.)) and other computations remotely (e.g., away from the users' site using the INs (e.g., 120A, 120B, etc.)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110B, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the INs (e.g., 120A, 120B, etc.)), store, or otherwise utilize captured sensor data (and/or any other type and/or quantity of data), and (iv) provide surveillance services (e.g., determining object-level information (e.g., information regarding objects in a scene that may be provided to other entities in the system), performing face recognition, etc.) for scenes (e.g., a physical region of space). One of ordinary skill will appreciate that the client may perform other functionalities without departing from the scope of the invention.

In one or more embodiments, the clients (e.g., 110A, 110B, etc.) may be geographically distributed devices (e.g., user devices, front-end devices, edge devices, etc.) and may have relatively restricted hardware and/or software resources when compared to the INs (e.g., 120A, 120B, etc.). As being, for example, a sensing device, each of the clients may be adapted to provide scene monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

As yet another example, a camera may provide sensor data in the form of images of objects in a scene. The sensor data may be used to, for example, infer a rate of vehicles that pass by the camera, a number of people on a walkway at a point-in-time, characteristics (e.g., position/orientation, a state of an optical indicate such as a light, etc.) of a second camera, etc. While the scene (e.g., a region of space) has been illustrated as including a limited number and specific types of components, regions of space in accordance with embodiments of the invention may include additional, fewer, and/or different components without departing from the scope of the invention.

Additionally, while the scene has been illustrated as having a specific shape, sensing devices in accordance with one or more embodiments of the invention may monitor scenes having different shapes. Further, the scenes monitored by different sensing devices may have different or the same shape without departing from the scope of the invention.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the invention. For example, the sensor data may be implemented as a tree, a table, a linked list, etc.

In one or more embodiments, the clients (e.g., 110A, 110B, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110B, etc.) may correspond to computing devices that one or more users use to interact with one or more components of the system (100).

In one or more embodiments, a client (e.g., 110A, 110B, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110B, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110B, etc.) may include functionality to request and use physical and logical resources of the client. Applications may also include functionality to use data stored in storage/memory resources of the client. The applications may perform other types of functionalities not listed above without departing from the scope of the invention. While providing application services to a user, applications may store data that may be relevant to the user in storage/memory resources of the client.

In one or more embodiments, to provide services to the users, the clients (e.g., 110A, 110B, etc.) may utilize, rely on, or otherwise cooperate with the INs (e.g., 120A, 120B, etc.). For example, the clients may issue requests to an IN of the INs to receive responses and interact with various components of the IN. The clients may also request data from and/or send data to the INs (for example, the clients may transmit information to an IN of the INs that allows the IN to perform computations, the results of which are used by the clients to provide services to the users). As yet another example, the clients may utilize application services provided by an IN of the INs. When the clients interact with an IN of the INs, data that is relevant to the clients may be stored (temporarily or permanently) in the IN.

In one or more embodiments, a client (e.g., 110A, 110B, etc.) may be capable of, e.g.: (i) collecting users' inputs, (ii) correlating collected users' inputs to the computer-implemented services to be provided to the users, (iii) communicating with the INs (e.g., 120A, 120B, etc.) that perform computations necessary to provide the computer-implemented services, (iv) using the computations performed by the INs to provide the computer-implemented services in a manner that appears (to the users) to be performed locally to the users, and/or (v) communicating with any virtual desktop (VD) in a virtual desktop infrastructure (VDI) environment (or a virtualized architecture) provided by an IN (using any known protocol in the art), for example, to exchange remote desktop traffic or any other regular protocol traffic (so that, once authenticated, users may remotely access independent VDs).

As described above, the clients (e.g., 110A, 110B, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110B, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the INs (e.g., 120A, 120B, etc.)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110B, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of DRAM and 1 CPU with 12 cores, whereas Client N (110N) may have 8 GB of PMEM and 1 CPU with 16 cores. Other different computational capabilities of the clients not listed above may also be taken into account without departing from the scope of the invention.

Figure 5:
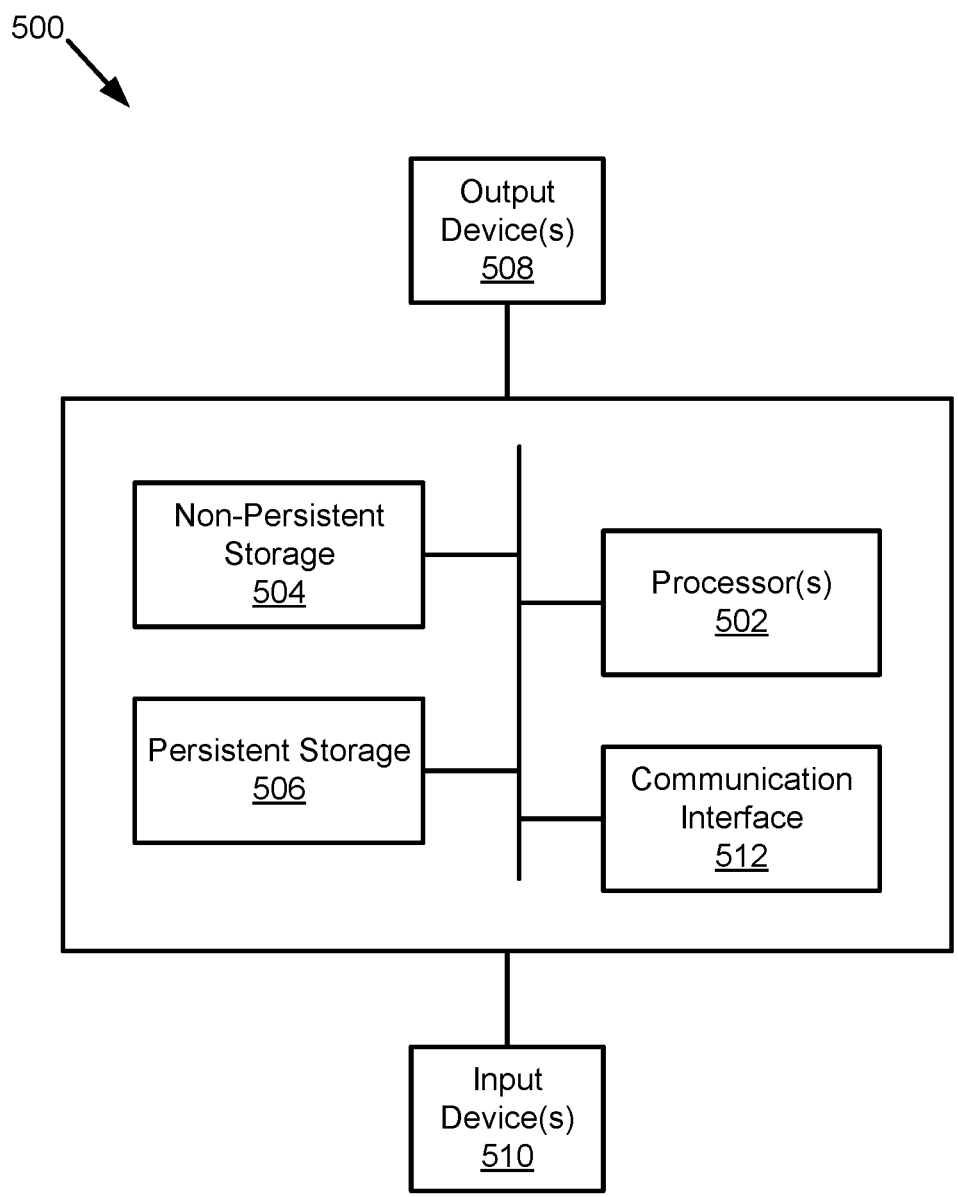
FIG. 5 shows a diagram of a computing device in accordance with one or more embodiments of the invention.

Further, in one or more embodiments, a client (e.g., 110A, 110B, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110B, etc.) may be implemented as a logical device (e.g., a VM). The logical device may utilize the computing resources of any number of computing devices to provide the functionality of the client described throughout this application.

In one or more embodiments, users may interact with (or operate) the clients (e.g., 110A, 110B, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, an IN (e.g., 120A) of the INs may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, an IN (e.g., 120A, 120B, etc.) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110B, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the long-term storage (140) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing a linear, non-linear, and/or machine learning (ML) model to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (e.g., 120N) for review and/or other human interactions; (x) exchange data with other devices registered in/to the network (130) in order to, for example, participate in a collaborative workload placement (e.g., the node may split up a request (e.g., an operation, a task, an activity, etc.) with another IN (e.g., 120N), coordinating its efforts to complete the request more efficiently than if the IN had been responsible for completing the request); (xi) provide software-defined data protection for the clients (e.g., 110A, 110B, etc.); (xii) provide automated data discovery, protection, management, and recovery operations for the clients; (xiii) monitor operational states of the clients; (xiv) regularly back up configuration information of the clients to the long-term storage (140); (xv) provide (e.g., via a broadcast, multicast, or unicast mechanism) information (e.g., a location identifier, the amount of available resources, etc.) associated with the IN to other INs (e.g., 120B, 120N, etc.); (xvi) configure or control any mechanism that defines when, how, and what data to provide to the clients and/or long-term storage; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations);

and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (e.g., 120A) may communicate with, for example, the long-term storage (140) and/or other databases (e.g., 102).

In one or more embodiments, monitoring the operational states of the clients (e.g., 110A, 110B, etc.) may be used to determine whether it is likely that the monitoring of the scenes by the clients results in information regarding the scenes that accurately reflects the states of the scenes (e.g., a client may provide inaccurate information regarding a monitored scene). Said another way, by providing monitoring services, the IN (e.g., 120A) may be able to determine whether a client is malfunctioning (e.g., the operational state of a client may change due to a damage to the client, malicious action (e.g., hacking, a physical attack, etc.) by third-parties, etc.). If the client is not in the predetermined operational state (e.g., if the client is malfunctioning), the IN may take action to remediate the client. Remediating the client may result in the client being placed in the predetermined operational state which improves the likelihood that monitoring of the scene by the client results in the generation of accurate information regarding the scene.

As described above, an IN (e.g., 120A) of the INs may be capable of providing a range of functionalities/services to the users of the clients (e.g., 110A, 110B, etc.). However, not all of the users may be allowed to receive all of the services. To manage the services provided to the users of the clients, a system (e.g., a service manager) in accordance with embodiments of the invention may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (e.g., 120A) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (e.g., 120A) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (e.g., 120A) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single IN (e.g., 120A) is considered above, the term "node" includes any collection of systems or sub-systems that individually or jointly execute a set, or multiple sets, of instructions to provide one or more computer-implemented services. For example, a single infrastructure node may provide a computer-implemented service on its own (i.e., independently) while multiple other nodes may provide a second computer-implemented service cooperatively (e.g., each of the multiple other nodes may provide similar and or different services that form the cooperatively provided service).

As described above, an IN (e.g., 120A) of the INs may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, an IN (e.g., 120A) of the INs may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the invention.

One of ordinary skill will appreciate that an IN (e.g., 120A) of the INs may perform other functionalities without departing from the scope of the invention. In one or more embodiments, INs may be configured to perform (in conjunction with the remaining components of the system (100)) all, or a portion, of the functionalities described in FIGS. 3, 4.1, and 4.2.

In one or more embodiments, an IN (e.g., 120A) of the INs may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110B, etc.), the IN may also be implemented as a logical device.

In one or more embodiments, a first IN (e.g., 120A) of the INs may host an analytics engine (127) and a second IN (e.g., 120N) of the INs may host a stream index API service (129); however, embodiments herein are not limited as such. For example, the first IN (e.g., 120A) may host both the analytics engine (127) and the stream index API service (129). As yet another example, the stream index API service (129) may be a separate entity from the second IN. As yet another example, the analytics engine (127) may be a separate entity from the first IN.

In the embodiments of the present disclosure, the streaming storage system (125) is demonstrated as a separate entity from the INs; however, embodiments herein are not limited as such. The streaming storage system (125) may be demonstrated as a part of an IN (e.g., as deployed to the IN). Additional details of the streaming storage system and the long-term storage (140) are described below in reference to FIG. 1.2.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the INs, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the INs through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of milliseconds (ms) or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

As discussed above, embodiments described herein are, at least, applicable to tiered streaming storage systems (e.g., 125) storing video stream data (or one or more video data streams) that need to serve an application and/or a user performing a data item search (or a content-aware data search) using, for example, the stream index API service (129). Referring to FIG. 1.2, the streaming storage system (125) (i) may provide an "unbounded" data stream abstraction, which is internally split into "bounded" segments/partitions, and (ii) may ingest video stream data and process the video stream data, via one or more writers and readers (or reader components and writer components). Further, video frames of the video stream data may need to be encoded and stored with fine granularity (e.g., on a per-frame basis or using overlapping video frames in order to provide a detailed context to the analytics engine (127) (so that the analytics engine may easily analyze/process/infer the data at a later point-in-time)).

Turning now to the analytics engine (127), the analytics engine (127) (e.g., Apache Flink, GStreamer (a multimedia pipeline framework), a serverless function engine, etc.) may include functionality to, e.g.: (i) be started directly as a standalone computing device, in containers, or managed by a resource framework; (ii) coordinate distributed execution of workloads/jobs (e.g., user analytics jobs, abstract analytics jobs, etc.); (iii) by employing a set of linear, non-linear, and/or ML models (e.g., NVIDIA DeepStream, OpenCV, etc.), analyze/process video frames (and/or audio segments) read from a video data stream to infer/identify/extract one or more features/objects/metadata (described below); (iv) read events (or video frames) from an "ingested" data stream for processing; (v) receive a video analytics job (e.g., an analytics job associated with a video data stream) from an administrator (via an interface); (vi) after processing one or more video data streams (e.g., including moving images and/or audio), store metadata and/or stream positions in the database (102); (vii) enable an administrator (by providing a user analytics job) to decide what type of inference logic/model needs to be applied to a video data stream (to generate an index later) (e.g., if the administrator wants to analyze/identify people's faces and/or license plate numbers in a video stream data, the administrator may request the analytics engine to implement a specific ML model); (viii) decide when to schedule the next task (or a set of tasks (which are considered as "abstract analytics jobs") such as reading/writing processes related to a data stream, writing video analytics results to an index (e.g., a pointer to/in the stream based on what features/objects the user wants to consider/identify), etc.) to be executed on one or more worker modules (e.g., hosted by another IN); (ix) through an abstract analytics job and in conjunction with the database engine (128), generate/store a context-based index (over an entire data stream (or a portion of the stream) (a) to optimize common types of queries executed by a user and (b) to allow the user to efficiently search for specified data items in the data stream in near real-time or at a later point-in-time) to the database (102) based on identified features and/or objects in the entire data stream (in which, a type of the index (e.g., a time-based index for a data stream (see FIG. 2.1), a document-based index for a data stream (see FIG. 2.2), etc.) may be decided by the user (based on what features/objects the user wants to index)); (x) with the help of the steaming storage system (125) (which makes historical video data processing easier and cost-effective), manage "batch" data read/write scenarios, in which an existing video data stream may need to be re-processed to build a newer index or update an existing index based on (a) the features/objects identified by a newer user analytics job or (b) an another feature that a user requests to obtain/infer from the existing video data stream; and/or (xi) store (temporarily or permanently) the aforementioned data and/or the output(s) of the above-discussed processes in a storage device (e.g., 102, 140, etc.).

Further, the analytics engine (127) (e.g., an indexing engine) may include functionality to, e.g.: (i) in conjunction with the database (102), perform content-based indexing of, at least, video data streams in tiered streaming storage systems (e.g., 125); (ii) obtain a status of an initiated task from a corresponding worker module, in which the status of the initiated task/job may specify information such as: (a) whether the task was successful and whether the task was completed within a predetermined period of time (e.g., 100% of the task was completed within the predetermined period of time), or (b) whether the task was unsuccessful and how much of the task was not completed within the predetermined period of time (e.g., 70% of the task was completed and 30% of the task was not completed); (iii) based on (ii), react to completed tasks and/or execution failures (e.g., not completed tasks), coordinate checkpoints for recovery; (iv) provide an interface (e.g., a representational state transfer (REST) interface) to communicate with one or more components of an IN (e.g., to submit one or more tasks to one or more worker modules for parallel execution) with minimum amount of latency (e.g., with high-throughput (e.g., a high data transfer rate) and sub-ms latency); (v) execute a GUI, for example, to provide information about application/job executions to an administrator; (vi) receive a request (e.g., a workload/job request) from a user via a client (e.g., receiving a request to execute a certain application or functionality) via the interface; (vii) analyze an intention specified in a request received from a user, for example, to decide where (e.g., which worker module) to deploy one or more workloads; (viii) deploy one or more workloads to an appropriate worker module based on (a) available computing resources (e.g., computing, memory, storage, virtualization, etc.) of the worker module and/or (b) one or more workload requirements; (ix) monitor the availability of computing resources on each of the worker modules; (x) communicate with each worker module across the INs to infer which worker module is healthy (or unhealthy); (xi) ensure that workloads are distributed evenly (across as many worker modules as possible); (xii) based on an additional analytics job received from an administrator (that requests indexing different video features (e.g., features to-be-indexed for the first time, features that are not indexed before, etc.)) and in conjunction with the database engine (128), re-index, for example, one or more contents of video stream data at a later point-in-time (e.g., a video data stream may need to be processed by different types of "inference" jobs during its lifetime, in which, apart from car license plate numbers, a user may want to identify a number of pedestrians within a specific scene using the same video stream data at a later point-in-time), specifically exploiting capabilities (discussed below in reference to FIG. 1.2) of the "tiered" streaming storage system (125); (xiii) obtain (or receive) data (e.g., any type and/or quantity of input) from any source (e.g., 125, 110A, etc.) (and, if necessary, aggregate the data); (xiv) perform complex data analytics (e.g., performing aggregated and correlated analytics) on data (e.g., a video data stream, an audio data stream, a BLOB, IoT sensor data, infrared images, etc.) that is received from a source to generate additional data that is derived from the obtained data without experiencing any middleware and hardware limitations; (xv) manage an analytics job (e.g., that identifies relevant features and/or objects from a video data stream) by achieving the maximum practical processing parallelism (without requiring resource-intensive efforts); (xvi) in conjunction with the long-term storage (140) and the database (102), support continuous storing and indexing of data streams; (xvii) monitor a scene by obtaining a video data stream regarding the scene from the streaming storage system (125); (xviii) based on (xvii), provide to other entities (in the system (100)), store, or otherwise utilize (for indexing purposes) (a) the video data stream and/or (b) information regarding the scene based on the data stream; (xix) be adapted to orchestrate operation of the database engine (128) in terms of indexing one or more features identified in a video data stream; (xx) based on (xvii), determine whether an action with respect to a scene or another scene should be taken (e.g., send an alert to an administrator regarding an object of interest that is disposed in the scene); (xxi) by employing a set of linear, non-linear, and/or ML models, automatically identify temporal and/or spatial events in a live or a recorded video (e.g., analyze several events in succession instead of a single event and transform the events into an actionable insight, process one or more objects per video frame and their movements across frames, etc.); (xxii) execute one or more tasks of a dataflow/job/workload (e.g., reading one or more events from a data stream (ingested by the streaming storage system (125)) and performing computations (e.g., text manipulation, numerical analysis, image manipulation, etc.) on the data stream); (xxiii) buffer and/or exchange one or more data streams with another analytics engine and/or worker module (e.g., to perform a batch analysis); (xxiv) provide automated data discovery, deduplication, protection, management, and/or recovery operations in on-premises; and/or (xxv) store (temporarily or permanently) the aforementioned data and/or the output(s) of the above-discussed processes in a storage device (e.g., 102, 140, etc.).

One of ordinary skill will appreciate that the analytics engine may perform other functionalities without departing from the scope of the invention.

In one or more embodiments, the analytics engine (127) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the analytics engine described throughout the application.

Alternatively, in one or more embodiments, similar to a client (e.g., 110A, 110B, etc.), the analytics engine may also be implemented as a logical device.

In one or more embodiments, worker modules (and/or analytics engines) may either execute tasks/jobs as a non-parallel (i.e., serial) process or as multiple parallel processes. As a non-parallel process, any worker module may be instantiated and execute tasks at any given time. When a worker module fails, for any number of reasons, a newer worker module may be instantiated to continue execution of the tasks. Should this newer worker module also fails, another new worker module may be instantiated to take its place. This non-parallel processing of the tasks continues until the tasks associated with the given workload successfully complete.

On the other hand, as a parallel process, any set of two or more worker modules may be instantiated and execute tasks at any given time. Successful completion of the tasks may be defined through a different metric (e.g., a specified number of successful completions by an equal specified number of worker modules). Each successful completion of the tasks may be tracked until the specified number of successful completions is reached, where at that point, the parallel processing of the tasks officially complete and terminate. When any given worker module fails, one or more newer worker modules may be instantiated in place of the failed worker module.

By way of a simplified example, a job/workload may be defined through three different tasks (or processes), e.g., a main process, which may handle the bulk of the workload, and two assistant processes, which may focus on the performance of minor responsibilities. In one embodiment, a first worker module may be instantiated to execute the main process, while a second worker module may be instantiated to execute the two assistant processes. In another embodiment, three separate worker modules may be instantiated to execute each different task (or process), respectively. Further, any given worker module, may fail for any number of reasons. When a failure transpires, a newer worker module may be instantiated to continue the subset of tasks (or processes) for which the failed worker module had been responsible.

To provide any quantity and any type of computer-implemented services/functionalities, the analytics engine (127) may utilize computing resources provided by various hardware components and/or logical components (e.g., virtualization resources) of, for example, IN A (120A). In one or more embodiments, a computing resource (e.g., a measurable quantity of a compute-relevant resource type that may be requested, allocated, and/or consumed) may be (or may include), for example (but not limited to): a CPU, a GPU, a DPU, a memory resource, a network resource, storage space/source (e.g., to store any type and quantity of information), storage input/output (I/O), a hardware resource set, a compute resource set (e.g., one or more processors, processor dedicated memory, etc.), a control resource set, etc.

In one or more embodiments, computing resources of IN A (120A) may be divided into three logical resource sets (e.g., a compute resource set, a control resource set, and a hardware resource set that may be implemented as separate physical devices). By logically dividing the computing resources of IN A (120A) into these resource sets, different quantities and types of computing resources may be allocated to the analytics engine (127). Dividing the computing resources in accordance with the three set model may enable different resource sets to be differentiated (e.g., given different personalities) to provide different functionalities. Further, different resource sets, or portions thereof, from the same or different INs may be aggregated to support the analytics engine (127) having at least one resource set from each set of the three resource set model. Consequently, the analytics engine (127) may be supported on the basis of desired functionalities rather than just on the basis of aggregate resources to be included in the analytics engine (127).

As described above, to support the analytics engine (127), IN A (120A) may include at least three resource sets including a control resource set. The control resource set may include a processor, in which the processor may mediate presentation of computing resources provided by the hardware resources (of IN A (120A)) to a compute resource set (e.g., as bare metal resources). When doing so, the processor may provide a layer of abstraction that enables the hardware resources to be, for example, virtualized, emulated as being compatible with other systems, and/or directly connected to the compute resource set (e.g., pass through). Consequently, the computing resources of the hardware resources may be finely, or at a macro level, allocated to the analytics engine (127).

In one or more embodiments, the control resource set may facilitate operation of the analytics engine (127). To do so, the control resource set may prepare any quantity of computing resources from any number of hardware resource sets (e.g., of corresponding INs) for presentation. Once prepared, the control resource set may present the prepared computing resources as bare metal resources to a composer (not shown) of IN A (120A). By doing so, the analytics engine (127) may be supported/instantiated.

To prepare the computing resources of the hardware resource sets for presentation, the control resource set may employ, for example, virtualization, indirection, abstraction, and/or emulation. These management functionalities may be transparent to components/applications hosted by IN A (120A). Consequently, while unknown to components of IN A (120A), the analytics engine (127) may operate in accordance with any number of management models.

While IN A (120A) has been illustrated and described as including a limited number of specific components, IN A (120A) may include additional, fewer, and/or different components than those mentioned above without departing from the scope of the invention.

In one or more embodiments, IN A (120A) may host multiple analytics engines, making an analytics engine highly available; that is, if any analytics engine fails or is shut down (which may directly affect jobs being executed), or one of components of an analytics engine fails, another analytics engine will take over. Similarly, IN N (120N) may host multiple stream index API services, making a stream index API service highly available; that is, if any stream index API service fails or is shut down (which may directly affect user requests/queries being executed), or one of components of a stream index API service fails, another stream index API service will take over.

For example, in order to provide redundancy and failover capabilities (so that an administrator may execute an analytics job in a more reliable and resilient way), IN A (120A) may spin up a newer version of the analytics engine (127) in parallel and switch traffic to the newer engine once the newer engine is ready. Further, the analytics engine (127) may operate as a provider agnostic system (e.g., the analytics engine (127) (and its components) may operate seamlessly regardless of the underlying provider).

Turning now to the database (102), the database (102) may provide long-term, durable, high read/write throughput data storage/protection with near-infinite scale and low-cost. The database (102) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (102) may also occupy a portion of a physical storage/memory device or, alternatively, may span across multiple physical storage/memory devices.

In one or more embodiments, the database (102) may be implemented using physical devices that provide data storage services (e.g., storing data and providing copies of previously stored data). The devices that provide data storage services may include hardware devices and/or logical devices. For example, the database (102) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (102) may include a memory device (e.g., a dual in-line memory device), in which data is stored and from which copies of previously stored data are provided. As yet another example, the database (102) may include a persistent storage device (e.g., an SSD), in which data is stored and from which copies of previously stored data is provided. As yet another example, the database (102) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (102) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database engine (128) may store/log/record (in the database (102)) unstructured and/or structured data (e.g., features, objects, contents, metadata, one or more attributes, etc., (i) associated with one or more video data streams and (ii) received from the analytics engine (127)) that may include (or specify), for example (but not limited to): an aspect of an entity/object (e.g., a vehicle, a person, etc.); one or more context clues (e.g., identifiers of events, an identifier of an entity, data and time information of an accident at a scene, etc.); stream position information of a data item; a license plate number of a vehicle (captured by a surveillance camera) in a particular period of time; a color/coloring a vehicle; one or more points-in-time and/or one or more periods of time associated with an event; information about a scene; an average number of vehicles in a period of time; a number of blue vehicles in a scene; a color of an entity; a type of an entity; a number of each type of entity; one or more static objects characteristics (e.g., information (extracted from sensor data) representative of static objects (e.g., non-transitory) in a scene such as a number of each type of static object in the scene, relative positioning and/or orientation of static objects with respect to other static objects in the scene, etc.); one or more dynamic objects characteristics (e.g., information (extracted from sensor data) representative of dynamic objects (e.g., transitory) in a scene such as a number of each type of dynamic object in the scene, relative positioning and/or orientation of dynamic objects with respect to other static objects in the scene, statistical information (e.g., average, mean, standard of deviation, etc.) regarding any of the aforementioned types of information, etc.); one or more structures adjacent to a road; one or more vehicles travelling on a road; one or more structures that are separated from a road by a walkway; a number of persons that are traveling on a walkway; information regarding an object of interest in a scene at one or more points-in-time and/or over one or more periods of time; an identifier of a sensor; a brand of a vehicle; an inferred bounding box regarding an object in a video data stream; information with respect to a person's face; a product identifier of a client (e.g., 110A); a type of a client; a number of elastic data streams received by the streaming storage system (125); a number of segment stores being executed on the streaming storage system; a type of data being ingested by the streaming storage system; a degree of parallelism (with respect to elastic data streams (described below in reference to FIG. 1.2)) supported by the streaming storage system; information with respect to elastic data streams; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; an identifier of a user who initiated a data stream (via a client); a user activity performed on a data item; a cumulative history of user/administrator activity records obtained over a prolonged period of time; a setting (and a version) of a mission critical application executing on the analytics engine (127); a product identifier of the analytics engine; a product configuration information associated with the analytics engine; a job detail (e.g., an amount of events read by the analytics engine at the same time); a type of a job (e.g., a non-parallel processing job, a parallel processing job, an analytics job, etc.) that has been initiated; information associated with a hardware resource set of IN A (120A); a completion timestamp encoding a date and/or time reflective of the successful completion of a job; a time duration reflecting the length of time expended for executing and completing a job; a backup retention period associated with a feature; a status of a job (e.g., how many jobs are still active, how many jobs are completed, etc.); a number of requests handled (in parallel) per minute (or per second, per hour, etc.) by the analytics engine; a number of errors encountered when handling a job; a documentation that shows how the analytics engine performs against an SLO and/or an SLA; a set of requests received by the analytics engine; a set of responses provided (by the analytics engine) to those requests; information regarding an administrator (e.g., a high priority trusted administrator, a low priority trusted administrator, etc.) related to an analytics job; a rate of vehicles that pass by a camera; a number of people on a walkway at a point-in-time; etc.

In one or more embodiments, information associated with a hardware resource set (e.g., including at least resource related parameters) may specify, for example (but not limited to): a configurable CPU option (e.g., a valid/legitimate vCPU count per analytics engine), a configurable network resource option (e.g., enabling/disabling single-root input/output virtualization (SR-IOV) for a specific analytics engine), a configurable memory option (e.g., maximum and minimum memory per analytics engine), a configurable GPU option (e.g., allowable scheduling policy and/or virtual GPU (vGPU) count combinations per analytics engine), a configurable DPU option (e.g., legitimacy of disabling inter-integrated circuit (I2C) for various analytics engines), a configurable storage space option (e.g., a list of disk cloning technologies across one or more analytics engines), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency QoS template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per analytics engine, a wake on LAN support configuration (e.g., supported/enabled, not supported/disabled, etc.), a vGPU count per analytics engine, a type of a vGPU scheduling policy (e.g., a "fixed share" vGPU scheduling policy), a storage mode configuration (e.g., an enabled high-performance storage array mode), etc.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the invention.

Additionally, while illustrated as being stored in the database (102), any of the aforementioned data structures may be stored in different locations (e.g., in persistent storage of other computing devices) and/or spanned across any number of computing devices without departing from the scope of the invention.

In one or more embodiments, the unstructured and/or structured data may be updated (automatically) by third party systems (e.g., platforms, marketplaces, etc.) (provided by vendors) and/or by the administrators (via the analytics engine (127)) based on, for example, newer (e.g., updated) versions of analytics jobs. The unstructured and/or structured data may also be updated when, for example (but not limited to): a re-indexing of a video data stream is required, a set of analytics jobs is received, an ongoing abstract analytics job is fully completed, a state of the analytics engine (127) is changed, etc.

While the database (102) has been illustrated and described as including a limited number and type of data, the database (102) may store additional, less, and/or different data without departing from the scope of the invention. One of ordinary skill will appreciate that the database (102) may perform other functionalities without departing from the scope of the invention.

Turning now to the database engine (128) (e.g., InfluxDB's engine, MongoDB's engine, OpenSearch's indexing engine, etc.), the database engine (128) may include functionality to, e.g.: (i) as part of an inferred/identified result(s) from an abstract analytics job (e.g., detecting relevant information (e.g., vehicle license plate numbers, face recognition/characterization, the stream content in one or more video frames, etc.) from video frames captured as stream events to be indexed later on), store the inferred results along with their positions/locations in a corresponding, for example, video data stream to the database (102) (e.g., to satisfy and/or to be more efficient on different types of user queries (see Step 400 of FIG. 4.1), the database may be a different type of database for specific user queries and/or workloads); (ii) based on (i), generate/build one or more indexes for the identified results (and their positions in the stream (as they appear)) in the database (102), in which the database engine efficiently relates, for example, entities/objects identified in the video data stream (a) for data management purposes and/or (b) for a better user experience; (iii) generate, organize, and store one or more indexes (e.g., data stream indexes) (for multiple analytics jobs (e.g., user-provided analytics jobs that identifies some features/entities in video frames of a video data stream) that are associated with one or more, for example, video data streams); (iv) receive, from the stream index API service (129), a request that includes a query (e.g., what is the color of the car with the plate number "GGG-222" ?) received from a user; (v) based on (iv), analyze the request; (vi) based on (v), identify an index that is associated with the query; (vii) based on (vi), send position information of a data item (e.g., a previously identified feature) in a data stream to the stream index API service (129); (viii) in conjunction with the stream index API service (129), enable administration unification and user abstraction (e.g., from directly interacting with an index and/or a data stream to fetch video frames that corresponds to one or more user queries); (ix) based on the stream index API service's (129) requests and/or the analytics engine's (127) requests, be functional to store video stream metadata for search and retrieval; (x) by employing a set of linear, non-linear, and/or ML models, generate, organize, and store one or more indexes depending on expected user submitted queries (via the stream index API service (129)); (xi) while generating an index, consider relationships among, for example, identified features from a video data stream (e.g., a lineage topology); and/or (xii) be functional to generate, organize, and store more than one index for a data stream (in parallel) to (a) increase/optimize data item (e.g., a feature, an object, etc.) search performance (of the database engine) in the database (102) (e.g., by reducing a required amount of database access(es) when implementing a data retrieval request) and (b) increase data item retrieval performance (e.g., getting a position of a feature in a data stream from the last time the feature identified in the data stream) of the stream index API service (129).

One of ordinary skill will appreciate that the database engine (128) may perform other functionalities without departing from the scope of the invention.

In one or more embodiments, the database engine (128) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the database engine described throughout the application.

Alternatively, in one or more embodiments, similar to a client (e.g., 110A, 1101B, etc.), the database engine may also be implemented as a logical device.

In one or more embodiments, with the help of the durability and ordering guarantees provided by the streaming storage system (125), an index may be generated as a durable and consistent stream position object. Said another way, no matter what data is added and/or removed (to and/or from) a data stream at a later point-in-time, (a) the index will still point to the same place in the data stream and (b) any entry (or a feature/a data item) can be retrieved (via the stream index API service (129)) in real-time or near real-time when the entry appears in the index.

Further, in conjunction with the analytics engine (127), the database engine (128) decouples the indexing of identified results/data items (and their positions in a given data stream) from actual data stream storage (e.g., streaming storage system (125), including the long-term storage (140)). For example, a user may make a size estimation of an index based on two parameters, such as (a) the video ingestion rate (in megabytes per second (MBps)) and (b) the rate of potentially indexed features/objects per second of a video stream data (or a video). Assume here that, in this example, the user works/operates with a high-quality video to identify license plate numbers at night, in which a corresponding camera records the high-quality video (e.g., 25 MBps). During the night (e.g., approximately eight hours), there are just few vehicles passing by the camera, indicating that (a) a rate of potentially indexed objects is 0.1 per second, (b) the overall storage consumption (in the streaming storage system (125), including the long-term storage (140)) is 720 GB, and (c) a corresponding analytics job would have added (to an index) 2880 new entries.

As yet another example, assume here that (a) the user works with ten surveillance cameras at a mall, in which each camera generates a video data stream of 10 MBps to identify people at the mall (e.g., the analytics job) and (b) during the business hours (e.g., twelve hours) of the mall, a rate of potentially indexed objects is 20 per second. Based on those, (a) the overall storage consumption (in the streaming storage system (125), considering the long-term storage (140)) is 4.3 terabytes (TB) of video stream data and (b) the analytics job would have added (to an index) 720,000 new entries.

As demonstrated in the aforementioned examples, decoupling the indexing from the stream storage makes a difference (e.g., in terms of performance, cost efficiency, etc.), in which the database (102) does not handle a high storage workload related to the video ingestion of the streaming storage system (125) (e.g., the actual video data stream(s) is stored in the long-term storage (140)).

In one or more embodiments, while the database (102) can be used for indexing and querying data that is extracted from a data stream, the embodiments disclosed herein are not limited as such. The analytics engine (127) may perform an inference over a data stream and generate an "event" stream (which supports parallel writes and parallel reads), in which events are the inference results. Thereafter, a user may query such an event stream using, for example, a distributed query engine (e.g., Presto) hosted by IN N (120N).

Turning now to the stream index API service (129) (or a stream index API interface, a GUI, a programmatic interface, a communication channel, etc.), the stream index API service (129) may include functionality to, e.g.: (i) obtain (or receive) data (e.g., any type and/or quantity of input, a data search query (e.g., "get the positions (in Stream A) where license plate 555 appeared yesterday"), etc.) from any source (e.g., a user via a client (e.g., 110A)) (and, if necessary, aggregate the data); (ii) based on (i) and by employing a set of linear, non-linear, and/or ML models, analyze, for example, a query to derive additional data; (iii) based on the derived data, send a request to the database engine (128) to retrieve position information of a data item (e.g., associated with a video data stream); (iv) provide a set of responses (e.g., original video frames that include queried features and/or relevant sensor data insights) for the received requests/queries; (v) by employing a set of linear, non-linear, and/or ML models, analyze information regarding a user (e.g., a high priority trusted user, a low priority trusted user, a malicious user, etc.) related to a query; (vi) store mappings between an incoming request/call/network traffic and an outgoing request/call/network traffic in a mapping table; (vii) store (e.g., in the long-term storage (140)) (a) a cumulative history of user activity records obtained over a prolonged period of time, (b) a cumulative history of network traffic logs obtained over a prolonged period of time, (c) previously received malicious data access/retrieval requests from an invalid user, and/or (d) recently obtained customer/user information (e.g., records, credentials, etc.) of a user; (viii) encompass hardware and/or software components and functionalities provided by IN N (120N) to operate as a service over the network (130) so that the stream index API service (129) may be used externally; (ix) employ a set of subroutine definitions, protocols, and/or hardware/software components for enabling/facilitating communications between the stream index API service (129) and external entities (e.g., the clients) such that the external entities may perform content-based data item search and/or retrieval (with minimum amount of latency (e.g., with high-throughput and sub-ms latency)); (x) employ a set of subroutine definitions, protocols, and/or hardware/software components to make a content of a data stream (e.g., a video content/frame (that includes one or more features) of a video data stream) searchable (so that a user may perform a content-aware data search in a data stream (e.g., a search based on the content provided by the user)); and/or (xi) in order to satisfy a user query/request, interact with the database engine (128) and/or one or more related data streams (managed by the streaming storage system (125)).

One of ordinary skill will appreciate that the stream index API service (129) may perform other functionalities without departing from the scope of the invention. The stream index API service may be implemented using hardware, software, or any combination thereof.

While FIG. 1.1 shows a configuration of components, other system configurations may be used without departing from the scope of the invention.

Turning now to FIG. 1.2, FIG. 1.2 shows a diagram/architecture of the streaming storage system (125) in accordance with one or more embodiments of the invention. The streaming storage system (125) (e.g., Dell Pravega or simply "Pravega") includes a controller (162), a logger (166) (e.g., a bookkeeper service), a segment store (SS) (164), and a consensus service (168) (e.g., a zookeeper service). The streaming storage system (125) may include additional, fewer, and/or different components without departing from the scope of the invention. For example, based on the amount of available computing resources, the streaming storage system (125) may host multiple controllers, segment containers (SCs) (e.g., 165A, 165B, etc.), and/or SSs executing contemporaneously, e.g., distributed across multiple servers, VMs, or containers, for scalability and fault tolerance. Each component may be operably connected to any of the other component via any combination of wired and/or wireless connections. Each component illustrated in FIG. 1.2 is discussed below.

The embodiment shown in FIG. 1.2 may show a scenario in which (i) one or more SCs (e.g., 165A, 165B, etc.) are distributed across the SS (164) and (ii) the streaming storage system (125) is an independent system (e.g., meaning that the streaming storage system may customize the resource usage of the SS independently, in an isolated manner).

In one or more embodiments, the streaming storage system (125) allows users (via clients (e.g., Client A (110A))) to ingest data and execute real-time analytics/processing on that data (while (i) guaranteeing data consistency and durability (e.g., once acknowledged, data is never lost), and (ii) providing a storage abstraction for continuous and unbounded data). With the help of the SS (164), the data may be progressively moved to the long-term storage (140) so that users may have access to the data to perform, for example, large-scale batch analytics (e.g., on a cloud (with more resources)), live and historical data playback, etc. Users may define clusters that execute a subset of assigned SCs across the system (e.g., 100, FIG. 1.1) so that different subsets of SCs may be executed on independent clusters (which may be customized in terms of instances and resources per-instance) to adapt different kinds of workloads and/or hardware components.

In one or more embodiments, the controller (162) may represent a "control plane" and the SS (164) may represent a "data plane". The SS (164) may execute/host, at least, SC A (165A) and SC (165B) (as "active" SCs, so they may serve write/read operations (e.g., low-latency durable atomic writes, low-latency end-to-end tail reads, etc.)), in which an SC is a unit of parallelism in Pravega (or a unit of work of a SS) and is responsible for executing any storage or metadata operations against the segments (described below) allocated in it. Due to the design characteristics of Pravega (e.g., with the help of the integrated storage tiering mechanism of Pravega), the SS (164) may store data (e.g., video data, which is, by nature, a continuous stream of data) to the long-term storage (140), in which the tiering storage may be useful to provide instant access to recent stream data. Although not shown, the streaming storage system may include one or more processors, buses, and/or other components without departing form the scope of the invention.

In one or more embodiments, an SC may represent how Pravega partitions a workload (e.g., a logical partition of the workload at the data plane) in order to host segments of streams (e.g., elastic, up and only unbounded infinite number of streams). Once (automatically) initialized/initiated, an SC may keep executing on its corresponding SS (e.g., a physical component) to perform one or more operations, where, for example, Client A (110A) may not be aware of what the location of an SC in Pravega (e.g., in case Client A wants to generate a new stream with a segment).

In one or more embodiments, depending on resource capabilities (e.g., resource related parameters) of the streaming storage system (125) (which may be customized over time), the SS (164) (and the SCs hosted by that SS) may provide different functionalities (e.g., providing a better performance). For example, a resource related parameter may include (or specify), for example (but not limited to): a configurable CPU option (e.g., a valid/legitimate virtual CPU count per SS), a configurable memory option (e.g., maximum and minimum memory per SS), a configurable DPU option (e.g., legitimacy of disabling I2C for different SSs), a vCPU count per SS, an SS IOMMU configuration (e.g., enabled, disabled, etc.), vGPU count per SS, number of SCs available to perform an operation, etc. Additional details of resource related parameters are described above in reference to FIG. 1.1.

In one or more embodiments, the control plane may include functionality to, e.g.: (i) in conjunction with the data plane, generate, alter, and/or delete data streams (e.g., index streams (which are useful to enforce retention), byte streams (which are useful to access data randomly at any byte offset), event streams (which are useful to allow parallel writes/reads), etc.); (ii) retrieve information about streams; and/or (iii) monitor health of a Pravega cluster (described below) by gathering metrics (e.g., data stream metrics). Further, the SS (164) may provide an API to read/write data in data streams.

In one or more embodiments, a stream (described below) may be partitioned/decomposed into stream segments (or simply "segments"). A stream may have one or more segments (where each segment may be stored in a combination of a durable log and long-term storage), in which data/event written into the stream may be written into exactly one of the segments based on the event's routing key (e.g., "writer.writeEvent(routingkey, message)"). In one or more embodiments, writers (e.g., of Client A (110A)) may use routing keys (e.g., user identifier, timestamp, machine identifier, etc., to determine a target segment for a stream write operation) so that data is grouped together.

In one or more embodiments, based on the inherent capabilities of the streaming storage system (125) (e.g., Pravega), data streams may have multiple open segments in parallel (e.g., enabling the data stream parallelism), both for ingesting and consuming data. The number of parallel stream segments in a stream may automatically grow and/or shrink over time based on the I/O load (or fluctuations) the stream receives, so that the parallelism of the stream may be modified based on a number of functions to be executed, if needed.

As described above, a data stream with one or more segments may support parallelism of data writes, in which multiple writers (or multiple writer components) writing data to different segments may exploit/involve one or more servers hosted in a Pravega cluster (e.g., one or more servers, the controller (162), and the SS (164) may collectively be referred to as a "Pravega cluster", in which the Pravega cluster may be coordinated to execute Pravega). In one or more embodiments, a consistent hashing scheme may be used to assign incoming events to their associated segments (such that each event is mapped to only one of the segments based on "user-provided" or "event" routing key), in which event routing keys may be hashed to form "key space" and the key space may be divided into a number of partitions, corresponding to the number of segments. Additionally, each segment may be associated with only one instance of SS (e.g., the SS (164)).

In one or more embodiments, from the perspective of a reader component (e.g., Client A (110A) may include a writer component and a reader component), the number of segments may represent the maximum degree of read parallelism possible (e.g., all the events from a set of streams will be read by only one reader in a "reader group (RG)". If a stream has N segments, then an RG with N reader components may consume from the stream in parallel (e.g., for any RG reading a stream, each segment may be assigned to one reader component in that RG). In one or more embodiments, increasing the number of segments may increase the number of readers in an RG to increase the scale of processing the data from that stream, whereas, as the number of segments decreases, the number of readers may be reduced.

In one or more embodiments, a reader component may read from a stream either at the tail of the stream or at any part of the stream's historical data. Unlike log-based systems that use the same kind of storage for tail reads/writes as well as reads to historical data, a tail of a stream may be kept in a durable log, where write operations may be implemented by the logger (166) as described herein. In some cases (e.g., when a failure has occurred and the system is being recovered), the logger may serve read operations.

In one or more embodiments, the streaming storage system (125) may implement exactly-once semantics (or "exactly once delivery semantics"), which means data is delivered and processed exactly-once (with exact ordering guarantees), despite failures in, for example, Client A (110A), servers, serverless functions (e.g., a mapper function, a reducer function, etc.), stateful operators, and/or the network (e.g., 130, FIG. 1.1). To achieve exactly-once semantics, streams may be durable, ordered, consistent, and/or transactional (e.g., embodiments of the invention may enable durable storage of streaming data with strong consistency, ordering guarantees, and high-performance).

As used herein, "ordering" may mean that data is read by reader components in the order it is written. In one or more embodiments, data may be written along with an application-defined routing key, in which the ordering guarantee may be made in terms of routing keys (e.g., a write order may be preserved by a routing key, which may facilitate write parallelism). For example, two pieces of data with the same routing key may be read by a reader in the order they were written. In one or more embodiments, Pravega (more specifically, the SS (164)) may enable an ordering guarantee to allow data reads to be replayed (e.g., when applications fail) and the results of replaying the reads (or the read processes) may be the same.

As used herein, "consistency" may mean that reader components read the same ordered view of data for a given routing key, even in the case of a failure (without missing any data/event). In one or more embodiments, Pravega (more specifically, the SS (164)) may perform idempotent writing processes, where rewrites performed as a result of failure recovery may not result in data duplication (e.g., a write process may be performed without suffering from the possibility of data duplication (and storage overhead) on reconnections).

In one or more embodiments, the SS (164) may automatically (e.g., elastically and independently) scale individual data streams to accommodate changes in a data ingestion rate. The SS may enable shrinking of write latency to ms, and may seamlessly handle high-throughput reads/writes from Client A (110A), making the SS ideal for IoT and other time-sensitive implementations. For example, consider a scenario where an IoT application receives information from hundreds of devices feeding thousands of data streams. In this scenario, the IoT application processes those streams to derive a business value from all that raw data (e.g., predicting device failures, optimizing service delivery through those devices, tailoring a user's experience when interacting with those devices, etc.). As indicated, building such an application at scale is difficult without having the components be able to scale automatically as the rate of data increases and decreases.

In one or more embodiments, a data stream may be configured to grow the number of segments as more data is written to the stream, and to shrink when data volume drops off. In one or more embodiments, growing and shrinking a stream may be performed based on a stream's SLO (e.g., to match the behavior of data input). For example, the SS (164) may enable monitoring a rate of data ingest/input to a stream and use the SLO to add or remove segments from the stream. In one or more embodiments, (i) segments may be added by splitting a segment/shard/partition of a stream (e.g., scaling may cause an existing segment, stored at the related data storage thus far, to be split into plural segments; scaling may cause an existing event, stored at the corresponding data storage thus far, to be split into plural events; etc.), (ii) segments may be removed by merging two segments (e.g., scaling may cause multiple existing segments to be merged into a new segment; scaling may cause multiple existing events to be merged into a new event; etc.), and/or (iii) the number of segments may vary over time (e.g., to deal with a potentially large amount of information in a data stream). Further, a configuration of a writer component may not change when segments are split or merged, and a reader component may be notified via a stream protocol when segments are split or merged to enable reader parallelism.

As discussed above, one or more readers are organized into a RG and the streaming storage system (125) guarantees that each event written to a data stream is sent exactly one reader with the RG. Further, different RGs may simultaneously read from any given data stream, in which each reader in a RG is assigned to zero or more SSs. This means that a reader that is assigned to a SS is the only reader (within its RG) that reads events from that SS. Readers within a RG may dynamically re-balance the assignment of segments, for example, upon a membership change (e.g., having more or less readers in a RG over time) or when the number of parallel SSs changes because of stream auto-scaling. With the help of the interface (e.g., the REST interface), the analytics engine (e.g., 127, FIG. 1.1) may read data streams (from the streaming storage system) to perform one or more analytics jobs.

In one or more embodiments, Pravega transactions (i) allow applications to prepare and then commit a set of events that may be written atomically to a data stream and/or (ii) guarantee that either all transaction events are eventually available for reading (or none of the transaction events are available for reading).

In one or more embodiments, Client A (110A) may send metadata requests to the controller (162) and may send data requests (e.g., write requests, read requests, create a stream, delete the stream, get the segments, etc.) to the SS (164). With respect to a "write path" (which is primarily driven by a sequential write performance of the logger (166)), the writer component of Client A (110A) may first communicate with the controller (162) to perform a write operation (e.g., appending events/data) and to infer which SS it supposed to connect to. Based on that, the writer component may connect to the SS (164) to start appending data. Thereafter, the SS (164) (more specifically, SCs hosted by the SS) may first write data (synchronously) to the logger (166) (e.g., the "durable log" of Pravega (which typically executes within the Pravega cluster), Apache Bookkeeper, a distributed write ahead log, etc.) to achieve data durability (e.g., in the presence of small write operations) and low-latency (e.g., <10 ms) before acknowledging the writer component on every data written (so that data may not be lost as data is saved in protected, persistent/temporary storage before the write operation is acknowledged).

Once acknowledged, in an offline process, the SS (164) may group the data (written to the logger (166) into larger chunks and asynchronously move the larger chunks to the long-term storage (140) (e.g., the "long-term storage" of Pravega, pluggable storage, AWS S3, Apache HDFS, Dell Isilon, Dell ECS, object storage, block storage, file system storage, etc.) for high read/write throughput (e.g., to perform batch analytics) (as indicated, Client A (110A) may not directly write to long-term storage) and for permanent data storage. For example, Client A may send a data request for storing and processing video data from a surgery in real-time (e.g., performing computations (or real-time analytics) on the video data captured by surgery cameras for providing augmented reality capabilities on the video data to help surgeons, where SC A (165A) may be used for this purpose), and eventually, this data may need to be available (or permanently stored) on a larger IT facility that hosts enough storage/memory and compute resources (e.g., for executing batch analytics on historical video data to train ML models, where the video data may be asynchronously available in the long-term storage).

Further, with respect to a "read path" (which is isolated from the write path), the reader component of Client A (110A) may first communicate with the controller (162) to perform a read operation and to infer which SS it supposed to connect to (e.g., via its memory cache, the SS (164) may indicate where it keeps the data such that the SS may serve tail of data from the cache). For example, if the data is not cached (e.g., historical data), the SS may pull data from the long-term storage (140) so that the reader component performs the read operation (as indicated, the SS may not use the logger (166) to serve a read request of the reader component, where the data in the logger may be used for recovery purposes when necessary).

In one or more embodiments, once data is (and/or will be) provided by Client A (110A) to the SS (164), users may desire access to the data managed by the SS. To facilitate provisioning of access to the data, the SS may manage one or more data structures (in conjunction with the logger (166)), such as block chains, that include information, e.g.: (i) related to data ownership, (ii) related to the data that is managed, (iii) related to users (e.g., data owners), and/or (iv) related to how users may access the stored data. In one or more embodiments, by providing data management services and/or operational management services (in conjunction with the logger) to the users and/or other entities, the SS may enable any number of entities to access data. As part of providing the data management services, the SS may provide (in conjunction with the logger and/or the long-term storage (140)) a secure method for storing and accessing data. By doing so, access to data in the logger may be provided securely while facilitating provisioning of access to the data.

The data management services and/or operational management services provided by the SS (164) (through, for example, its SCs) may include, e.g.: (i) obtaining data requests and/or data from Client A (110A) (where, for example, Client A performs a data write operation through a communication channel); (ii) organizing and/or writing/storing the "obtained" data (and metadata regarding the data) to the logger (166) to durably store the data; (iii) generating derived data based on the obtained data (e.g., grouping the data into larger chunks by employing a set of linear, non-linear, and/or ML models), (iv) providing/moving the obtained data, derived data, and/or metadata associated with both data to the long-term storage (140); (v) managing when, how, and/or what data Client A may provide; (vi) temporarily storing the obtained data in its cache for serving that data to reader components; and/or (vii) queueing one or more data requests.

In one or more embodiments, as being part of the tiered storage streaming system (e.g., the durable log), the logger (166) may provide short-term, low-latency data storage/protection while preserving/guaranteeing the durability and consistency of data written to streams. In some embodiments, the logger may exist/execute within the Pravega cluster. As discussed above, the SS (164) may enable low-latency, fast, and durable write operations (e.g., data is replicated and persisted to disk before being acknowledged) to return an acknowledgement to a writer component (e.g., of Client A (110A)), and these operations may be optimized (in terms of I/O throughput) with the help of the logger.

In one or more embodiments, to add further efficiency, write operations to the logger (166) may involve data from multiple segments, so the cost of persisting data to disk may be amortized over several write operations. The logger may persist the most recently written stream data (to make sure reading from the tail of a stream can be performed as fast as possible), and as data in the logger ages, the data may be moved to the long-term storage (140) (e.g., a tail of a segment may be stored in a durable log providing low-latency reads/writes, whereas the rest of the segment may be stored in long-term storage providing high-throughput read access with near-infinite scale and low-cost). Further, the Pravega cluster may use the logger as a coordination mechanism for its components, where the logger may rely on the consensus service (168).

One of ordinary skill will appreciate that the logger (166) may perform other functionalities without departing from the scope of the invention. The logger may be implemented using hardware, software, or any combination thereof.

In one or more embodiments, in case of reads, SC A (165A) may have a "read index" that tracks the data read for the related segments, as well what fraction of that data is stored in cache. If a read process (e.g., initiated upon receiving a read request) requests data for a segment that is not cached, the read index may trigger a read process against the long-term storage (140) to retrieve that data, storing it in the cache, in order to serve Client A (110A).

As used herein, data may refer to a "stream data (or a "stream")" that is a continuous (or continuously generated), unbounded (in size), append-only (e.g., data in a stream cannot be modified but may be truncated, meaning that segments are indivisible units that form the stream), lightweight (e.g., as a file), and durable sequence of bytes (e.g., a continuous data flow/structure that may include data, metadata, and/or the like; a collection of data records called "events", in which there may not be a limit on how many events can be in a stream or how many total bytes are stored in a stream; etc.) generated (in parallel) by one or more data sources (e.g., 110A, 110B, IoT sensors, etc.). In one or more embodiments, by using append-only log data structures (which are useful for serverless computing frameworks while supporting real-time and historical data access), the SS (164) may enable rapid ingestion of information into durable storage (e.g., the logger (166)) and support a large variety of application use cases (e.g., publish/subscribe messaging, NoSQL databases, event-oriented applications, etc.). Further, a writer component may keep inserting events at one end of a stream and a reader component may keep reading the latest ones from there or for historical reads, the reader component may target specific offsets and keep reading from there.

As used herein, an event may be a collection of bytes within a stream (or a contiguous set of related extents of unbounded, continuously generated data) (e.g., a small number of bytes including a temperature reading from an IoT sensor composed of a timestamp, a metric identifier, and a value; web data associated with a user click on a website; a timestamped readout from one sensor of a sensor array; etc.). Said another way, events (which are atomic) may be appended to segments of a data stream (e.g., a stream of bytes), where segments are the unit of storage of the data stream (e.g., a data stream may be comprised of one or more segments, where (i) each segment may include one or more events (where a segment may not store events directly, the segment may store the append-only sequence of bytes of the events) and (ii) events may be appended to segments by serializing them into bytes, where once written, that sequence of bytes is immutable). In one or more embodiments, events may be stored along a data stream in parallel to one another and/or in succession to one another (where segments may provide parallelism). That is, one or more events may have data occurring in parallel, or having occurred in parallel. Further, one or more events may sequentially follow one or more other events, such as having data that occurs after one or more other events, or has occurred after data from one or more other events.

In one or more embodiments, the number of segments for appending and/or truncating (e.g., the oldest data from a stream without compromising with the data format) may vary over a respective unit axis of a data stream. It will be appreciated that a data stream may be represented relative to a time axis. That is, data and/or events may be written to and/or appended to a stream continuously, such as in a sequence or in an order. Likewise, such data may be reviewed and/or analyzed by a user in a sequence or in an order (e.g., a data stream may be arranged based upon a predecessor-successor order along the data stream).

Sources of data written, posted, and/or otherwise appended to a stream may include, for example (but not limited to): online shopping applications, social network applications (e.g., producing a stream of user events such as status updates, online transactions, etc.), IoT sensors, video surveillance cameras, drone images, autonomous vehicles, servers (e.g., producing a stream of telemetry information such as CPU utilization, memory utilization, etc.), etc. The data from streams (and thus from the various events appended to the streams) may be consumed, by ingesting, reading, analyzing, and/or otherwise employing in various ways (e.g., by reacting to recent events to analyze historical stream data).

In one or more embodiments, an event may have a routing key, which may be a string that allows Pravega and/or administrators to determine which events are related (and/or which events may be grouped) (e.g., when working with data streams having parallel segments, applications requiring total order of events are expected to use routing keys for writing data). A routing key may be derived from data, or it may be an artificial string (e.g., a universally unique identifier) or a monotonically increasing number. For example, a routing key may be a timestamp (to group events together by time), or an IoT sensor identifier (to group events by a machine). In one or more embodiments, a routing key may be useful to define precise read/write semantics. For example, (i) events with the same routing key may be consumed in the order they were written and (ii) events with different routing keys sent to a specific reader will always be processed in the same order even if that reader backs up and re-reads them.

As discussed above, Pravega (e.g., an open-source, distributed and tiered streaming storage system providing a cloud-native streaming infrastructure (i) that is formed by controller instances and SS instances, (ii) that eventually stores stream data in a long-term storage (e.g., 140), (iii) that enables auto-scaling of streams (where a degree of parallelism may change dynamically in order to react workload changes) and its connection with serverless computing, and (iv) that supports both a byte stream (allowing data to be access randomly by any byte offset) and an event stream (allowing parallel writes/reads)) may store and manage/serve data streams, in which the "stream" abstraction in Pravega is a first-class primitive for storing continuous and unbounded data. A data stream in Pravega guarantees strong consistency and achieves good performance (with respect to data storage and management), and may be combined with one or more stream processing engines (e.g., Apache Flink, task managers, etc.) to initiate streaming applications.

In one or more embodiments, Client A (110A) may concurrently have dynamic write/read access to a stream where other clients (using the streaming storage system (125)) may be aware of all changes being made to the stream. The SS (164) may track data that has been written to the stream. Client A may update the stream by sending a request to the SS that includes the update and a total length of the stream that was written at the time of a last read update by Client A. If the total length of the stream received from Client A matches the actual length of the stream maintained by the SS, the SS may update the stream. If not, a failure message may be sent to Client A and Client A may process more reads to the stream before making another attempt to update the stream.

In one or more embodiments, Client A (110A) may provide a client library that may implement an API for the writer and reader components to use (where an application may use the API to read and write data from and to the storage system). The client library may encapsulate a protocol used for a communication between Client A and Pravega (e.g., the controller (162), the SS (164), etc.). As discussed above, (i) a writer component may be an application that generates events/data and writes them into a stream, in which events may be written by appending to the tail (e.g., front) of the stream; (ii) a reader component may be an application that reads events from a stream, in which the reader component may read from any point in the stream (e.g., a reader component may be reading events from a tail of a stream); and (iii) events may be delivered to a reader component as quickly as possible (e.g., events may be delivered to a reader component within tens of ms after they were written).

In one or more embodiments, segments may be illustrated as "Sn" with "n" being, for example, one through ten. A low number n indicates a segment location closer to a stream head and a high number n indicates a segment location closer to a stream tail. In general, a stream head refers to the smallest offsets of events that have no predecessor (e.g., the beginning of a stream, the oldest data, etc.). Such events may have no predecessor because either such events are the first events written to a stream or their predecessors have been truncated. Likewise, a stream tail refers to the highest offsets of events of an open stream that has no successor (e.g., the most recently written events and/or last events, the end of a stream where new events are appended, etc.). In one or more embodiments, a segment may be (i) an "open segment" indicating that a writer component may write data to that segment and a reader component may consume that data at a later point-in-time, and (ii) a "sealed/immutable segment" indicating that the segment is read-only (e.g., which may not be appended).

In one or more embodiments, a reader component may read from earlier parts (or at an arbitrary position) of a stream (referred to as "catch-up reads", where catch-up read data may be cached on demand) and a "position object (or simply a "position")" may represent a point in the stream that the reader component is currently located.

As used herein, a "position" may be used as a recovery mechanism, in which an application (of Client A (110A)) that persist the last position of a "failed" reader component that has successfully processed may use that position to initialize a replacement reader to pick up where the failed reader left off. In this manner, the application may provide exactly-once semantics (e.g., exactly-once event processing) in the case of a reader component failure.

In one or more embodiments, multiple reader components may be organized into one or more RGs, in which an RG may be a named collection of readers that together (e.g., in parallel, simultaneously, etc.) read events from a given stream. Each event published into a stream may be guaranteed to be sent to one reader component within an RG. In one or more embodiments, an RG may be a "composite RG" or a "distributed RG", where the distributed RG may allow a distributed application to read and process data in parallel, such that a massive amount of data may be consumed by a coordinated fleet of reader components in that RG. A reader (or a reader component) in an RG may be assigned zero or more stream segments from which to read (e.g., a segment is assigned to one reader in the RG, which gives the "one segment to one reader" exclusive access), in which the number of stream segments may be balanced to which the reader is assigned. For example, the reader may read from two stream segments while another reader in the RG may only read one stream segment.

In one or more embodiments, reader components may be added to an RG, or reader components fail and may be removed from the RG, and a number of segments in a stream may determine the upper bound of "read" parallelism of readers/reader components within the RG. Further, an application (of Client A (110A)) may be made aware of changes in segments (via the SS (164)). For example, the application may react to changes in the number of segments in a stream (e.g., by adjusting the number of readers in an associated RG) to maintain maximum read parallelism if resources allow.

In one or more embodiments, events may be appended to a stream individually, or may be appended as a stream transaction (no size limit), which is supported by the streaming storage system (125). As used herein, a "transaction" refers to a group/set of multiple events (e.g., a writer component may batch up a bunch of events in the form of a transaction and commit them as a unit into a stream). For example, when the controller (162) invokes committing a transaction (e.g., as a unit into a stream), the group of events included in the transaction may be written (via the writer component) to a stream as a whole (where the transaction may span multiple segments of the stream) or may be abandoned/discarded as a whole (e.g., if the writer component fails). With the use of transactions, a writer component may persist data at a point-in-time, and later decide whether the data should be appended to a stream or abandoned. In one or more embodiments, a transaction may be implemented similar to a stream, in which the transaction may be associated with multiple segments and when an event is published into the transaction, (i) the event itself is appended to a segment of the transaction (where data written to the transaction is just as durable as data written directly to a stream) and (ii) the event may not be visible to a reader component until that transaction is committed. Further, an application may continuously produce results of a data processing operation and use the transaction to durably accumulate the results of the operation.

In one or more embodiments, as being a stateless component, the controller (162) may (further) include functionality to, e.g.: (i) manage the lifecycle of a stream and/or transactions, in which the lifecycle of the stream includes features such as generation, scaling, modification, truncation, and/or deletion of a stream (in conjunction with the SS (164)); (ii) manage/enforce a retention policy for a stream that specifies how the lifecycle features are implemented (e.g., requiring periodic truncation (described below) based on size and time bounds); (iii) manage transactions (e.g., generating transactions (e.g., generating transaction segments), committing transactions (e.g., merging transaction segments), aborting transactions (e.g., dropping a transaction segment), etc.); (iv) be dependent on stateful components (e.g., the consensus service (168), the logger (166) (for the write ahead log functionalities)); (v) manage (and authenticate) metadata requests (e.g., get information about a segment, get information about a stream, etc.) received from Client A (110A) (e.g., manage stream metadata); (vi) be responsible for distribution/assignment of SCs into one or more SSs executing on the streaming storage system (125) (e.g., if a new SS (or a new SS instance) is added to the streaming storage system, the controller may perform a reassignment of SCs along all existing SSs to balance/split the workload); (vii) be responsible for making sense of segments; (viii) manage/enforce an auto-scaling policy for a stream that allows the streaming storage system to automatically change the segment parallelism of a data stream based on an ingestion workload (e.g., events/bytes per second); and/or (ix) manage a control plane of the streaming storage system.

In one or more embodiments, although data streams are typically unbounded, truncating them may be desirable in practical real-world scenarios to manage the amount of storage space the data of a stream utilizes relative to a stream storage system. This may particularly be the case where storage capacity is limited. Another reason for truncating data streams may be regulatory compliance, which may dictate an amount of time an application retains data.

In one or more embodiments, a stream may dynamically change over time and, thus, metadata of that stream may change over time as well. Metadata of a stream may include (or specify), for example (but not limited to): configuration information of a segment, history of a segment (which may grow over time), one or more scopes, transaction metadata, a logical structure of segments that form a stream, etc. The controller (162) may store metadata of streams (which may enable exactly-once semantics) in a table segment, which may include an index (e.g., a B+ tree index) built on segment attributes (e.g., key-value pairs associated to segments). In one or more embodiments, the corresponding "stream metadata" may further include, for example, a size of a data chunk stored in long-term storage (140) and an order of data in that data chunk (for reading purposes and/or for batch analytics purposes at a later point-in-time).

As used herein, a "scope" may be a string and may convey information to a user/administrator for the corresponding stream (e.g., "FactoryMachines"). A scope may act as a namespace for stream identifiers (e.g., as folders do for files) and stream identifiers may be unique within a scope. Further, a stream may be uniquely identified by a combination of its stream identifier and scope. In one or more embodiments, a scope may be used to separate identifiers by tenants (in a multi-tenant environment), by a department of an organization, by a geographic location, and/or any other categorization a user selects.

One of ordinary skill will appreciate that the controller (162) may perform other functionalities without departing from the scope of the invention. The controller may be implemented using hardware, software, or any combination thereof.

In one or more embodiments, as being a stateless component, the SS (164) may (further) include functionality to, e.g.: (i) manage the lifecycle of segments (where the SS may be unaware of streams but may store segment data); (ii) generate, merge, truncate, and/or delete segments, and serve read/write requests received from Client A (110A); (iii) use both a durable log (e.g., 166) and long-term storage (140) to store data and/or metadata; (iv) append new data to the durable log synchronously before responding to Client A, and write data asynchronously to the long-term storage (which is the primary destination of data); (v) use its cache to serve tail stream reads, to read ahead from the long-term storage, and/or to avoid reading from the durable log when writing to the long-term storage; (vi) monitor the rate of event traffic in each segment individually to identify trends and based on these trends, associate a trend label (described below) with the corresponding segment; (vii) make sure that each segment maps to only one SC (via a hash function) at any given time, in which that SS instance may maintain metadata (e.g., a rate of traffic into the related segment locally, a scaling type, a target rate, etc.); (viii) in response to a segment being identified as being either hot or cold, the hot/cold segment state is communicated to a central scaling coordinator component of the controller (162) (in which that component consolidates the individual hot/cold states of multiple segments and calculates a centralized auto-scaling decision for a stream such as by replacing hot segments with multiple new segments and/or replacing multiple cold segments with a consolidated new segment); (ix) be dependent on stateful components (e.g., the consensus service (168), the logger (166) (for the write ahead log functionalities)); (x) manage data paths (e.g., a write path, a read path, etc.); (xi) manage (and authenticate) data requests received from Client A; and/or (xii) manage a data plane of the streaming storage system (125) (e.g., implement read, write, and other data plane operations).

One of ordinary skill will appreciate that the SS (164) may perform other functionalities without departing from the scope of the invention. The SS may be implemented using hardware, software, or any combination thereof.

In one or more embodiments, a trend label may have one of three values, e.g., "normal", "hot", or "cold". A segment identified as "hot" may be characterized by a traffic trend that is greater than a predetermined target rate of traffic. The target rate may be supplied by a user via predetermined a stream policy (e.g., a stream/scaling policy may be defined on a data stream such that if a segment gets more than the required number of events, it may be divided). A segment identified as "cold" may be characterized by a traffic trend that is less than the target traffic rate. For example, a hot segment may be a candidate for scale-up into two or more new segments (e.g., Segment 2 being split into Segment 4 and Segment 5). As yet another example, a cold segment may be a candidate for scale-down via merger with one or more other cold segments (e.g., Segment 4 and Segment 5 being merged into Segment 6). As yet another example, a normal segment may be a candidate for remaining as a single segment.

In one or more embodiments, a consensus service may be required to have/keep a consistent view/state of a current SC distribution/assignment across the streaming storage systems (executing on the system (e.g., 100, FIG. 1.1)). For example, identifiers of SCs and their assignments may need to be consistent across the streaming storage systems and one way to achieve this is implementing the consensus service. To this end, the consensus service (168) (e.g., Apache Zookeeper) may include functionality to, e.g.: (i) perform one or more coordination tasks (e.g., helping to the controller (162) for the assignment/distribution of SCs to SS instances, helping a split of workloads across segments, etc.), and/or (ii) store no stream metadata.

One of ordinary skill will appreciate that the consensus service (168) may perform other functionalities without departing from the scope of the invention. The consensus service may be implemented using hardware, software, or any combination thereof.

In one or more embodiments, SC A (165A) and SC B (165B) may allow users and/or applications to read/access data that was written in SC A and SC B and stored in the long-term storage (140) at the background. In one or more embodiments, SC A and SC B may be useful to perform an active-passive data replication. For example, SC A and SC B are writing data and at the same time, SS A and SS B may serve batch analytics tasks (e.g., batch reads) of data processing applications (of Client A (110A)) (for example, for a better user experience).

Further, the embodiment provided in FIG. 1.2 may utilize the inherent capabilities of the streaming storage system (125) to move data to the long-term storage (140) jointly with the SCs (e.g., 165A, 165B, etc.) as a form of active-passive data replication, which is useful for various different analytics workloads. For example, a user (of Client A (110A)) may perform real-time analytics on stream data (with the help of the logger (166), where the logger may persist the most recently written stream data) and at the same time, the related SCs (e.g., SC A, SC B, etc.) may move the data progressively to the long-term storage (140) (i) for serving batch reads/analytics at a later point-in-time (for example, upon receiving a batch read request from the user) and (ii) for enabling storage tiering capabilities provided by the streaming storage system (e.g., to perform active-passive data replication).

In one or more embodiments, as being part of the tiered storage streaming system, the long-term storage (140) may provide long-term (e.g., near-infinite retention), durable, high read/write throughput (e.g., to perform batch analytics; to perform generate, read, write, and delete operations; erasure coding; etc.) historical stream data storage/protection with near-infinite scale and low-cost. The long-term storage may be, for example (but not limited to): pluggable storage, AWS S3, Apache HDFS, Dell Isilon, Dell ECS, object storage, block storage, file system storage, etc. In one or more embodiments, the long-term storage may be located/deployed outside of the streaming storage system (125), in which asynchronous migration of events from a durable log to long-term storage (without affecting the performance of tail reads/writes) may reflect different access patterns to stream data.

In one or more embodiments, the long-term storage (140) may be a fully managed cloud (or local) storage that acts as a shared storage/memory resource that is functional to store unstructured and/or structured data. Further, the long-term storage may also occupy a portion of a physical storage/memory device or, alternatively, may span across multiple physical storage/memory devices.

In one or more embodiments, the long-term storage (140) may be implemented using physical devices that provide data storage services (e.g., storing data and providing copies of previously stored data). The devices that provide data storage services may include hardware devices and/or logical devices. For example, the long-term storage may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the long-term storage (140) may include a memory device (e.g., a dual in-line memory device), in which data is stored and from which copies of previously stored data are provided. As yet another example, the long-term storage may include a persistent storage device (e.g., an SSD), in which data is stored and from which copies of previously stored data is provided. As yet another example, the long-term storage may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the long-term storage (140) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the long-term storage (140) may store/log/record unstructured and/or structured data that may include (or specify), for example (but not limited to): a valid (e.g., a granted) request and its corresponding details, an invalid (e.g., a rejected) request and its corresponding details, historical stream data and its corresponding details, content of received/intercepted data packets/chunks, information regarding a sender (e.g., a malicious user, a high priority trusted user, a low priority trusted user, etc.) of data, information regarding the size of intercepted data packets, a mapping table that shows the mappings between an incoming request/call/network traffic and an outgoing request/call/network traffic, a cumulative history of user activity records obtained over a prolonged period of time, a cumulative history of network traffic logs obtained over a prolonged period of time, previously received malicious data access requests from an invalid user, a backup history documentation of a workload, a model name of a hardware component, a version of an application, a product identifier of an application, an index of an asset (e.g., a file, a folder, a segment, etc.), recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the controller (162), power consumption of components of the streaming storage system (125), etc. Based on the aforementioned data, for example, the analytics engine (e.g., 127, FIG. 1.1) may perform user analytics to infer profiles of users communicating with components exist in the streaming storage system.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the unstructured and/or structured data may be maintained by, for example, IN A (e.g., 120A, FIG. 1.1). IN A may add, remove, and/or modify those data in the long-term storage (140) to cause the information included in the long-term storage to reflect the latest version of, for example, SLAs. The unstructured and/or structured data available in the long-term storage may be implemented using, for example, lists, tables, unstructured data, structured data, etc. While described as being stored locally, the unstructured and/or structured data may be stored remotely, and may be distributed across any number of devices without departing from the scope of the invention.

While the long-term storage (140) has been illustrated and described as including a limited number and type of data, the long-term storage may store additional, less, and/or different data without departing from the scope of the invention. In the embodiments described above, the long-term storage is demonstrated as a separate entity; however, embodiments herein are not limited as such. In one or more embodiments, the long-term storage may be a part of a cloud.

One of ordinary skill will appreciate that the long-term storage (140) may perform other functionalities without departing from the scope of the invention. The long-term storage may be implemented using hardware, software, or any combination thereof.

While FIG. 1.2 shows a configuration of components, other system configurations may be used without departing from the scope of the invention.

Figure 2:
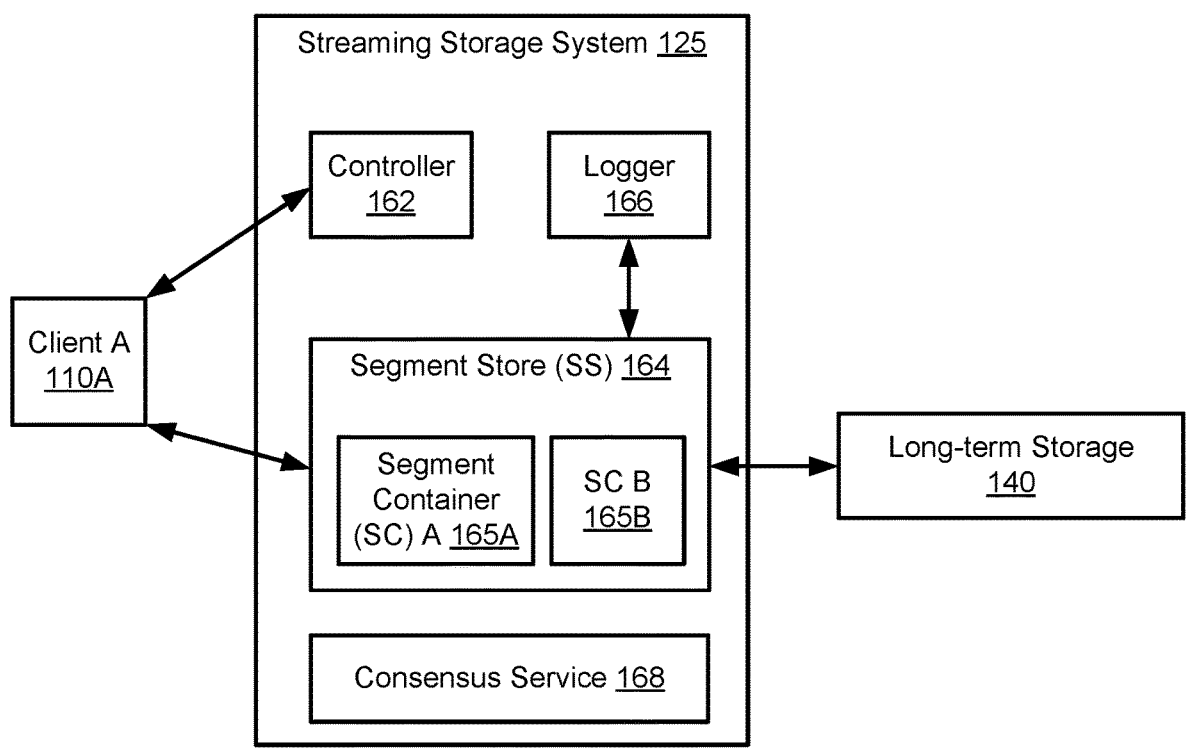
FIG. 2.1 shows an example time-based indexing in accordance with one or more embodiments of the invention.

Turning now to FIG. 2.1, FIG. 2.1 shows an example time-based indexing (or one or more time-based indexes) in accordance with one or more embodiments of the invention. Referring to FIG. 2.1, a time-based index (on video data streams) may specify (or include), for example (but not limited to): a timestamp (e.g., time 0, time 1, time 2, etc.) indicating when an identified feature appeared in a video data stream, stream position information (e.g., S0:100, S0:200, S0:300, etc.) of a previously identified feature (in a video data stream), a car license plate number (e.g., ABC-123, BBB-456, KKK-123, etc.), a color of a car (e.g., red, green, blue, etc.), etc.

In one or more embodiments, if expected queries from a user (based on historical data) regarding an index (e.g., a pointer to an identified vehicle license plate number, a durable reference associated to a video frame, etc.) are more related to time, the database engine (e.g., 128, FIG. 1.1) (in conjunction with the analytics engine (e.g., 127, FIG. 1.1) and the "temporal" database (e.g., 102, FIG. 1.1)) may generate one or more time-based indexes for one or more features/objects/metadata identified in a video data stream. In one or more embodiments, an expected query from a user may include (or specify), for example (but not limited to): "what is the average number of cars per hour?", "was car with plate "BBB-456" recorded yesterday?", "how many red cars were recorded last year?", etc.

Turning now to FIG. 2.2, FIG. 2.2 shows an example document-based indexing (or one or more document-based indexes) in accordance with one or more embodiments of the invention. Referring to FIG. 2.2, a document-based index (on video data streams) may specify (or include), for example (but not limited to): information with respect to an identified vehicle license plate number (e.g., ABC-123), information with respect to a color of an identified vehicle (e.g., red), information with respect to a stream position (e.g., S0:100) of an identified feature (in a video data stream), information with respect to a brand of an identified vehicle (e.g., BGBG), information with respect to a model of an identified vehicle (e.g., 15R), etc.

In one or more embodiments, if expected queries from a user (based on historical data) regarding an index are more related to aspects of an entity/object (e.g., a vehicle, a person, etc.), the database engine (e.g., 128, FIG. 1.1) (in conjunction with the analytics engine (e.g., 127, FIG. 1.1) and the "document" database (e.g., 102, FIG. 1.1)) may generate one or more document-based indexes for one or more features/objects/metadata identified in a video data stream. In one or more embodiments, an expected query from a user may include (or specify), for example (but not limited to): "what is the color of the car with the plate number "ABC-123" ?", "is car with the plate number "ABC-123" a "BGBG-15R?", etc.

Figure 3:
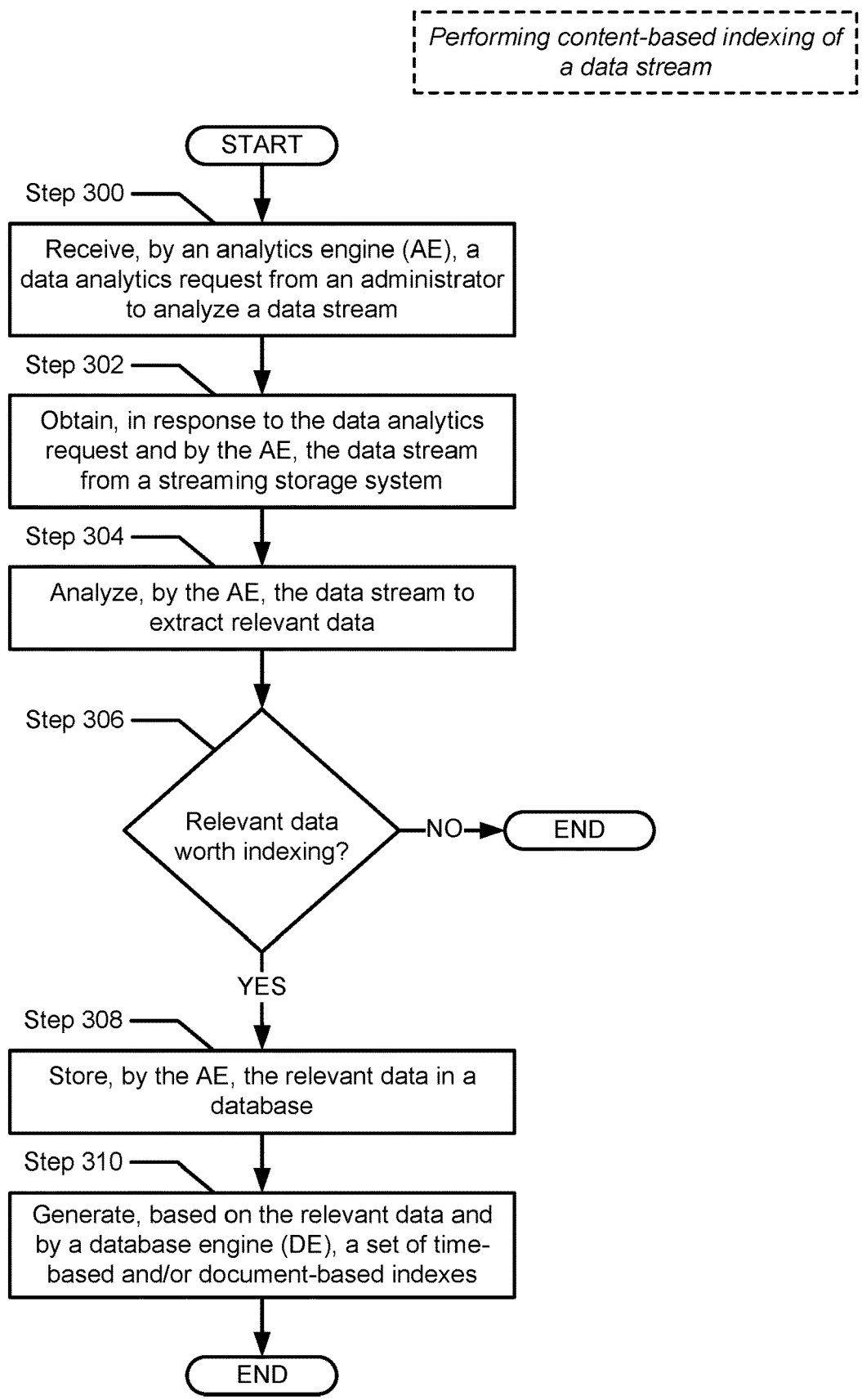
FIG. 3 shows a method for performing content-based indexing of a data stream in accordance with one or more embodiments of the invention.

FIG. 3 shows a method for performing content-based indexing of a data stream in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3, the method shown in FIG. 3 may be executed by, for example, the above-discussed analytics engine (e.g., 127, FIG. 1.1), streaming storage system (e.g., 125, FIG. 1.1), database engine (e.g., 128, FIG. 1.1), and database (e.g., 102, FIG. 1.1). Other components of the system (100) illustrated in FIG. 1.1 may also execute all or part of the method shown in FIG. 3 without departing from the scope of the invention.

In Step 300, the analytics engine receives a data analytics request from a requesting entity (e.g., an administrator, an administrator terminal, an application, etc.) to analyze a data stream (e.g., a video data stream), in which the request may include/specify information with respect to the data stream, an analytics job (which may include logic that infers and/or detects relevant information/data from video frames (where each frame may store a timestamp as 64-bit nanoseconds) that are captured as stream events to be indexed at a later point-in-time), and/or administrator-specific information (e.g., an identifier of the administrator, an identifier of the data stream, a type of the data stream, a type of an analytics job (in which the administrator may specify (a) what type of indexing should be performed on the data stream and/or (b) what features should be identified for indexing), etc.).

In Step 302, in response to receiving the request, as part of that request, and/or in any other manner (e.g., before initiating any computation with respect to the request), the analytics engine invokes the streaming storage system (where the analytics engine may have dynamic read access to the data stream (e.g., events may be delivered to the analytics engine as quickly as possible (e.g., events may be delivered to the analytics engine within tens of ms after they were written))) to communicate with the streaming storage system.

After receiving the streaming storage system's confirmation, the analytics engine obtains the data stream (e.g., a video from a surveillance camera) from the streaming storage system (which can store vast amounts of historical and/or live data associated with video data streams that may require to be re-indexed over time (see Step 406 of FIG. 4.1)). In one or more embodiments, the data stream may be obtained continuously (without affecting production workloads of the streaming storage system and the analytics engine), as events are written, or the data stream may be obtained in batches. In one or more embodiments, the data stream may be access-protected for the transmission from, for example, the streaming storage system (via the long-term storage (e.g., 140, FIG. 1.1)) to the analytics engine, e.g., using encryption.

In one or more embodiments, the data stream may be obtained as it becomes available or by the analytics engine polling the streaming storage system (via one or more API calls) for newer information. For example, based on receiving an API call from the analytics engine, the streaming storage system may allow the analytics engine to obtain newer information.

In Step 304, by employing a set of linear, non-linear, and/or ML models, the analytics engine analyzes the data stream (obtained in Step 302) to extract relevant data (e.g., features, objects, metadata, etc., requested to be extracted/identified in the analytics job). As discussed above in reference to FIG. 1.1, one of the functionalities of the analytics engine is executing an "administrator-provided" analytics job that will analyze/process, for example, video frames of the data stream and extract relevant/valuable features and/or infer information about video frames. In one or more embodiments, by executing an analytics job, the analytics engine may process, for example, one video frame at a time (which may be useful to generate a time-based index or a document-based index). Details of the relevant data are described above in reference to FIG. 1.1.

In one or more embodiments, if the models that are used by the analytics engine are not operating properly (e.g., are not providing the above-discussed functionalities), the models may be re-trained using any form of training data and/or the models may be updated periodically as there are improvements in the models (e.g., the models are trained using more appropriate training data).

In Step 306, based on Step 304, the analytics engine makes a determination (in real-time or near real-time) as to whether the relevant data is worth indexing. Accordingly, in one or more embodiments, if the result of the determination is YES (indicating that relevant data specify features/objects requested to be identified in the analytics job), the method proceeds to Step 308. If the result of the determination is NO (indicating that, for example, per-frame processing of the data stream did not identify any of the requested features/objects (so there is no data to index)), the method alternatively ends.

In Step 308, as a result of the determination in Step 306 being YES, the analytics engine stores the relevant data (e.g., inferred results), along with their positions/locations (e.g., position information) in the data stream, to the database. From the perspective of the database engine, this is a key process to generate an index (see Step 310), as the database engine will relate features/objects specified in the relevant data with their positions in the data stream (where they appear). Further, based on the result of the determination, the analytics engine may send an alert/notification to the administrator indicating that, for example, an object of interest is stored in the database.

In Step 310, based on the relevant data, position information, per-frame processing, and expected queries to be submitted by a user, the database engine generates (in parallel, if necessary to enable performance benefits (see FIG. 1.1)) a set of time-based indexes and/or document-based indexes (which will be useful for detailed data search and/or retrieval from the corresponding storage (see FIG. 4.1)). In one or more embodiments, the granularity of indexing the data stream may vary, from indexing the entire data stream (e.g., the entire video) to individual video frames, scenes, objects, and/or spoken words. Details of a time-based index and a document-based index are described above in reference to FIGS. 2.1 and 2.2, respectively.

In one or more embodiments, the method may end following Step 310.

FIGS. 4.1 and 4.2 show a method for performing data retrieval from a user's perspective in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be executed by, for example, the above-discussed stream index API service (e.g., 129, FIG. 1.1), database engine, and analytics engine. Other components of the system (100) illustrated in FIG. 1.1 may also execute all or part of the method shown in FIG. 4.1 without departing from the scope of the invention.

In Step 400, the stream index API service receives a query (e.g., a user may submit a query (or may perform a data search) to retrieve "the last video frame where a car with a license plate number A4547 has been identified a week ago") from a requesting entity (e.g., the user, a client, etc.) about a data item (e.g., a feature, an object, a video frame, etc.). For example, the user may send a query for data exploration purposes.

In Step 402, in response to receiving the query, as part of that query, and/or in any other manner (e.g., before initiating any computation with respect to the query), the stream index API service invokes the database engine to communicate with the database engine. Thereafter, the stream index API service sends a request to the database engine, in which the request may include the query initiated by the user.

In Step 404, upon receiving the request (which includes the query) and by employing a set of linear, non-linear, and/or ML models, the database engine analyzes the query to infer (and validate) information related to the query (e.g., the last video frame where a red car with a license plate number A4547 has been identified, information regarding the user (e.g., a trusted user, a malicious user, etc.) that has sent the query, etc.).

In Step 406, based on Step 404, the database engine makes a determination (in real-time or near real-time) as to whether a re-indexing is required. Accordingly, in one or more embodiments, if the result of the determination is YES, the method proceeds to Step 416. If the result of the determination is NO, the method alternatively proceeds to Step 408.

In one or more embodiments, upon receiving the request (in Step 402), the database engine may perform a search within the database to respond to the request. For example, based on the request, the database engine (i) may locate/find and access one or more indexes associated with the query (specified in the request) and indicate that the indexes are ready to be presented to the stream index API service (the "NO" case), or (ii) may not find and access one or more indexes associated with the query and indicate that the indexes are not ready to be presented to the stream index API service (the "YES" case).

In one or more embodiments, "(ii)" may indicate a content-aware search/query that has never been received before. For example, apart from retrieving information with respect to the car license plate numbers identified yesterday, the user may want to retrieve information with respect to the number of pedestrians within a specific scene using the same data stream today. "(ii)" may further indicate that the models (e.g., the trained models) used by the analytics engine and/or the database engine are not operating properly, and those models may need to be re-trained using any form of training data (e.g., using other possible analytics jobs once an analytics job is received from the administrator) and/or those models may be updated periodically as there are improvements in the trained models.

In one or more embodiments, based on "(ii)", the administrator may have two options: (a) the administrator may want to re-index (and re-process) newer data that has been written to the data stream using an updated version of the trained model (ML model one→ML model two) (e.g., the administrator may want to re-index the tail of the data stream (up to a certain position in the stream) using "ML model two" to generate/add newer indexes in the database) or (b) the administrator may want to re-index the entire data stream using the updated version of the trained model (e.g., the administrator may want to index the entire data stream (where the streaming storage system enables high-throughput historical data reads) using "ML model two" to modify the existing indexes in the database).

In Step 408, as a result of the determination in Step 406 being NO and in response to the request (as part of that request and/or in any other manner), the database engine identifies an index that is associated with the query in the database.

In Step 410, based on the index (where the queried information may be quickly located and accessed/retrieved from the data stream via the index), the database engine sends position information (e.g., a stream position (or a video frame position) for the query submitted by the user) of the data item (e.g., based on the last time the data item was identified) to the stream index API service.

In Step 412, upon receiving the position information, the stream index API service communicates with the streaming storage system (where the stream index API service may have dynamic read access to the data stream) and a send a data retrieval request (including the position information associated with the queried data item) to the streaming storage system (which supports efficient seeking of data items using position information). After receiving the streaming storage system's confirmation (with respect to the data retrieval request) and using the position information (where the user does not need be aware of the positon information), the stream index API service retrieves the data item from the streaming storage system (or more specifically, from the data stream).

In Step 414, the stream index API service initiates displaying of the "retrieved" data item to the user in response to the user's query (received in Step 400). In one or more embodiments, the data item (e.g., a thumbnail associated with the query, multiple video frames and related sensor data associated with the query, etc.) may be displayed/presented on a GUI of the corresponding client (e.g., 110A, FIG. 1.1), in which the data item may be highlighted on the GUI so that the user may replay a video (in a video player) related to the query (e.g., a historical and/or live playback of a related portion of the data stream in any video format). In one or more embodiments, the method may end following Step 414.

In Step 416, as a result of the determination in Step 406 being YES and in response to the request (as part of that request and/or in any other manner), the database engine notifies the administrator that an index associated with the query could not be found.

In Step 418, the administrator sends a second data analytics request to the analytics engine to re-analyze the entire data stream based on the query (received in Step 400), in which the request may include/specify a second analytics job (which may include newer logic that infers and/or detects relevant information/data from video frames) and/or administrator-specific information (e.g., an identifier of the administrator, an identifier of the data stream, a type of the data stream, a type of an analytics job (in which the administrator may specify (a) what type of indexing should be performed on the data stream and/or (b) what features should be identified for indexing), etc.).

In Step 420, in response to receiving the second data analytics request, as part of that request, and/or in any other manner (e.g., before initiating any computation with respect to the second data analytics request), the analytics engine invokes the streaming storage system to communicate with the streaming storage system.

After receiving the streaming storage system's confirmation, the analytics engine obtains the data stream from the streaming storage system (e.g., via the long-term storage). In one or more embodiments, the data stream may be obtained continuously (without affecting production workloads of the streaming storage system and the analytics engine), as events are written, or the data stream may be obtained in batches. In one or more embodiments, the data stream may be access-protected for the transmission from, for example, the streaming storage system to the analytics engine, e.g., using encryption.

In one or more embodiments, the data stream may be obtained as it becomes available or by the analytics engine polling the streaming storage system (via one or more API calls) for newer information. For example, based on receiving an API call from the analytics engine, the streaming storage system may allow the analytics engine to obtain newer information.

Turning now to FIG. 4.2, the method shown in FIG. 4.2 may be executed by, for example, the above-discussed stream index API service, database engine, and analytics engine. Other components of the system (100) illustrated in FIG. 1.1 may also execute all or part of the method shown in FIG. 4.2 without departing from the scope of the invention.

In Step 422, by employing a set of linear, non-linear, and/or ML models (e.g., ML model two), the analytics engine analyzes the data stream to extract second relevant data in accordance with the query (e.g., features, objects, metadata, etc., requested to be extracted/identified in the second analytics job). In Step 424, the analytics engine stores the second relevant data (e.g., inferred results), along with their positions/locations (e.g., position information) in the data stream, to the database. In one or more embodiments, the analytics engine may send an alert/notification to the administrator indicating that, for example, an object of interest (related to the query) is stored in the database.

In Step 426, based on the second relevant data, position information, per-frame processing, the query, and other possible queries to be submitted by the user, the database engine generates (in parallel, if necessary to enable performance benefits) a second set of time-based indexes and/or document-based indexes (which will be useful for detailed data search and/or retrieval from the corresponding storage). In one or more embodiments, the granularity of indexing the data stream may vary, from indexing the entire data stream (e.g., the entire video) to individual video frames, scenes, objects, and/or spoken words.

In Step 428, in response to the request (received in Step 402 of FIG. 4.1), the database engine identifies/locates and access an index associated with the query (specified in the request) and indicate that the index is ready to be presented to the stream index API service. In Step 430, based on the index located in Step 428 (where the queried information may be quickly located and accessed/retrieved from the data stream), the database engine sends position information (e.g., a stream position (or a video frame position) for the query submitted by the user) of the data item (e.g., based on the last time the data item was identified) to the stream index API service.

In Step 432, upon receiving the position information, the stream index API service communicates with the streaming storage system and a send a data retrieval request (including the position information associated with the queried data item) to the streaming storage system. After receiving the streaming storage system's confirmation (with respect to the data retrieval request) and using the position information (where the user does not need be aware of the positon information), the stream index API service retrieves the data item from the streaming storage system (or more specifically, from the data stream).

In Step 434, the stream index API service initiates displaying of the "retrieved" data item to the user in response to the user's query (received in Step 400 of FIG. 4.1). In one or more embodiments, the data item (e.g., a thumbnail associated with the query, multiple video frames and related sensor data associated with the query, etc.) may be displayed/presented on a GUI of the corresponding client (e.g., 110A, FIG. 1.1), in which the data item may be highlighted on the GUI so that the user may replay a video (in a video player) related to the query (e.g., a historical and/or live playback of a related portion of the data stream in any video format). In one or more embodiments, the method may end following Step 434.

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data stream (DS), the method comprising:
   receiving, by an analytics engine (AE), a first request from an administrator to analyze the DS,
      wherein the first request specifies an identifier of the administrator, an identifier of the DS, and an analytics job,
      wherein the analytics job specifies what type of indexing needs be performed on the DS and what features from the DS need be identified for indexing;
   in response to the first request and by the AE, obtaining the DS from a streaming storage system (SSS);
   performing a first analyzing, by the AE, of the DS to extract relevant data that is requested to be identified in the analytics job;
   making, based on the first analyzing and by the AE, a first determination that the relevant data is worth indexing, wherein the relevant data is worth indexing because the relevant data specifies features requested to be identified in the analytics job;
   in response to the first determination and by the AE, storing the relevant data in a database, wherein the AE, the SSS, and the database communicate over a network;
   generating, based on the relevant data and by a database engine (DE) hosted by the database, a set of indexes corresponding to at least a portion of the DS;
   receiving, by an application programming interface (API) service, a query about a data item in the DS from a user;
   sending, by the API service, a second request to the DE comprising the query;
   performing a second analyzing, by the DE, of the query;
   making, based on the second analyzing and by the DE, a second determination that a re-indexing of the portion of the DS is not required;
   in response to the second determination and by the DE, identifying an index from the set of indexes that is associated with the query;
   sending, based on the index and by the DE, position information of the data item to the API service;
   retrieving, based on the position information and by the API service, the data item from the SSS; and
   initiating, by the API service, displaying of the data item to the user in response to the query.

2. The method of claim 1,
   wherein the set of indexes comprises at least a time-based index and a document-based index,
   wherein, when the query specifies a period of time, the DE uses the time-based index to find the position information of the data item, wherein the data item is a video frame of video data, and
   wherein, when the query specifies an aspect of an entity as part of the data item, the DE uses the document-based index to find the position of the data item.

3. The method of claim 1,
   wherein the DS is a continuous, unbounded, append-only, and durable sequence of bytes, and
   wherein a controller of the SSS manages the DS.

4. The method of claim 3, wherein the SSS comprises a durable log, wherein the durable log is a distributed write-ahead log providing short-term, durable, and low-latency data protection of the portion of the DS.

5. The method of claim 4, wherein the SSS stores the portion of the DS to a long-term storage, wherein the long-term storage is a pluggable object storage providing long-term and durable data protection of the portion of the DS.

6. The method of claim 1, wherein the relevant data specifies at least one selected from a group consisting of a color of an entity, a license plate number of a second entity in a particular period of time, a type of the entity, a number of each type of entity, an identifier of a third entity, information about a scene, and the position information of the data item.

7. The method of claim 1, wherein the first analyzing is a per-frame processing of the portion of the DS that is obtained from a camera.

8. A method for managing a data stream (DS), the method comprising:
- receiving, by an analytics engine (AE), a first request from an administrator to analyze the DS,
  - wherein the first request specifies an identifier of the administrator, an identifier of the DS, and an analytics job,
  - wherein the analytics job specifies what type of indexing needs be performed on the DS and what features from the DS need be identified for indexing;
- in response to the first request and by the AE, obtaining the DS from a streaming storage system (SSS);
- performing a first analyzing, by the AE, of the DS to extract relevant data that is requested to be identified in the analytics job;
- making, based on the first analyzing and by the AE, a first determination that the relevant data is worth indexing, wherein the relevant data is worth indexing because the relevant data specifies features requested to be identified in the analytics job;
- in response to the first determination and by the AE, storing the relevant data in a database, wherein the AE, the SSS, and the database communicate over a network;
- generating, based on the relevant data and by a database engine (DE) hosted by the database, a set of indexes corresponding to at least a portion of the DS;
- receiving, by an application programming interface (API) service, a query about a data item in the DS from a user;
- sending, by the API service, a second request to the DE comprising the query;
- performing a second analyzing, by the DE, of the query;
- making, based on the second analyzing and by the DE, a second determination that a re-indexing of the portion of the DS is required;
- in response to the second determination and by the DE, notifying the administrator that an index that is associated with the query does not exist;
- receiving, in response to the notifying and by the AE, a third request from the administrator to re-analyze the DS based on the query;
- performing a third analysis, by the AE, of the DS to extract second relevant data, wherein the second relevant data is stored in the database;
- generating, based on the second relevant data and by the DE, a second set of indexes corresponding at least the portion of the DS;
- in response to the second request and by the DE, identifying the index from the second set of indexes that is associated with the query;
- sending, based on the index and by the DE, position information of the data item to the API service;
- retrieving, based on the position information and by the API service, the data item from the SSS; and
- initiating, by the API service, displaying of the data item to the user in response to the query.

9. The method of claim 8,
- wherein the second set of indexes comprises at least a time-based index and a document-based index,
- wherein, when the query specifies a period of time, the DE uses the time-based index to find the position information of the data item, wherein the data item is a video frame of video data, and
- wherein, when the query specifies an aspect of an entity as part of the data item, the DE uses the document-based index to find the position of the data item.

10. The method of claim 8,
- wherein the DS is a continuous, unbounded, append-only, and durable sequence of bytes, and
- wherein a controller of the SSS manages the DS.

11. The method of claim 10, wherein the SSS comprises a durable log, wherein the durable log is a distributed write-ahead log providing short-term, durable, and low-latency data protection of the portion of the DS.

12. The method of claim 11, wherein the SSS stores the portion of the DS to a long-term storage, wherein the long-term storage is a pluggable object storage providing long-term and durable data protection of the portion of the DS.

13. The method of claim 8, wherein the first analyzing is a per-frame processing of the portion of the DS that is obtained from a camera.

14. The method of claim 8, wherein the second relevant data specifies at least one selected from a group consisting of a color of an entity, a license plate number of a second entity in a particular period of time, a type of the entity, a number of each type of entity, an identifier of a third entity, information about a scene, and the position information of the data item.

15. A non-transitory computer readable medium (CRM) comprising computer readable program code, which when executed by a computer processor enables the computer processor to perform a method for managing a data stream (DS), the method comprising:
- receiving, by an analytics engine (AE), a first request from an administrator to analyze the DS,
  - wherein the first request specifies an identifier of the administrator, an identifier of the DS, and an analytics job,
  - wherein the analytics job specifies what type of indexing needs be performed on the DS and what features from the DS need be identified for indexing;
- in response to the first request and by the AE, obtaining the DS from a streaming storage system (SSS);
- performing a first analyzing, by the AE, of the DS to extract relevant data that is requested to be identified in the analytics job;
- making, based on the first analyzing and by the AE, a first determination that the relevant data is worth indexing, wherein the relevant data is worth indexing because the relevant data specifies features requested to be identified in the analytics job;
- in response to the first determination and by the AE, storing the relevant data in a database, wherein the AE, the SSS, and the database communicate over a network;
- generating, based on the relevant data and by a database engine (DE) hosted by the database, a set of indexes corresponding to at least a portion of the DS;
- receiving, by an application programming interface (API) service, a query about a data item in the DS from a user;
- sending, by the API service, a second request to the DE comprising the query;
- performing a second analyzing, by the DE, of the query;
- making, based on the second analyzing and by the DE, a second determination that a re-indexing of the portion of the DS is not required;
- in response to the second determination and by the DE, identifying an index from the set of indexes that is associated with the query;
- sending, based on the index and by the DE, position information of the data item to the API service;
- retrieving, based on the position information and by the API service, the data item from the SSS; and initiating, by the API service, displaying of the data item to the user in response to the query.

16. The CRM of claim 15,
wherein the set of indexes comprises at least a time-based index and a document-based index,
wherein, when the query specifies a period of time, the DE uses the time-based index to find the position information of the data item, wherein the data item is a video frame of video data, and
wherein, when the query specifies an aspect of an entity as part of the data item, the DE uses the document-based index to find the position of the data item.

17. The CRM of claim 15,
wherein the DS is a continuous, unbounded, append-only, and durable sequence of bytes, and
wherein a controller of the SSS manages the DS.

18. The CRM of claim 17, wherein the SSS comprises a durable log, wherein the durable log is a distributed write-ahead log providing short-term, durable, and low-latency data protection of the portion of the DS.

19. The CRM of claim 18, wherein the SSS stores the portion of the DS to a long-term storage, wherein the long-term storage is a pluggable object storage providing long-term and durable data protection of the portion of the DS.

20. The CRM of claim 15, wherein the relevant data specifies at least one selected from a group consisting of a color of an entity, a license plate number of a second entity in a particular period of time, a type of the entity, a number of each type of entity, an identifier of a third entity, information about a scene, and the position information of the data item.

* * * * *